US010708469B2

(12) United States Patent
Oto

(10) Patent No.: US 10,708,469 B2
(45) Date of Patent: Jul. 7, 2020

(54) IMAGE PROCESSING APPARATUS, METHOD OF CONTROLLING THE SAME, NON-TRANSITORY COMPUTER-READABLE STORAGE MEDIUM, AND IMAGE PROCESSING SYSTEM

(71) Applicant: CANON KABUSHIKI KAISHA, Tokyo (JP)

(72) Inventor: Hiroshi Oto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/117,543

(22) Filed: Aug. 30, 2018

(65) Prior Publication Data
US 2019/0075222 A1 Mar. 7, 2019

(30) Foreign Application Priority Data
Sep. 7, 2017 (JP) .................................. 2017-172424

(51) Int. Cl.
*H04N 5/222* (2006.01)
*H04N 13/161* (2018.01)
(Continued)

(52) U.S. Cl.
CPC .......... *H04N 5/2226* (2013.01); *H04N 5/232* (2013.01); *H04N 5/23258* (2013.01);
(Continued)

(58) Field of Classification Search
CPC .. H04N 13/161; H04N 13/282; H04N 5/2226; H04N 17/002; H04N 5/232; H04N 5/23258; H04N 5/23267
See application file for complete search history.

(56) References Cited

U.S. PATENT DOCUMENTS

2001/0004404 A1* 6/2001 Itokawa ............... H04N 9/8042
382/239
2003/0012560 A1* 1/2003 Mori ..................... H04N 5/772
386/248
(Continued)

FOREIGN PATENT DOCUMENTS

JP 2004032680 A 1/2004

OTHER PUBLICATIONS

Sano, Naito, and Watanabe, "Temporal bit allocation for low delay coding by using Motion JPEG2000", 2004AVM47-24, Dec. 2004.

*Primary Examiner* — Jamie J Atala
*Assistant Examiner* — Joon Kwon
(74) *Attorney, Agent, or Firm* — Carter, DeLuca & Farrell LLP

(57) ABSTRACT

This invention can control a code amount while suppressing image quality degradation of a virtual view-point image. An image processing apparatus comprises a reception unit which receives encoded image data from an image capturing device of interest among a plurality of image capturing devices, a determination unit which determines, based on an index value of an image quality represented by encoded image data received in the past from the image capturing device of interest and the index value of an image quality represented by encoded image data transmitted by another image capturing device, a permissible range of a target image quality of a captured image, and a setting unit which sets, in an encoding unit of the image capturing device of interest, an encoding parameter according to an image quality in the determined permissible range.

16 Claims, 14 Drawing Sheets

(51) Int. Cl.
*H04N 13/282* (2018.01)
*H04N 17/00* (2006.01)
*H04N 5/232* (2006.01)

(52) U.S. Cl.
CPC ....... *H04N 5/23267* (2013.01); *H04N 13/161* (2018.05); *H04N 13/282* (2018.05); *H04N 17/002* (2013.01)

(56) References Cited

U.S. PATENT DOCUMENTS

| | | | | |
|---|---|---|---|---|
| 2003/0133169 | A1* | 7/2003 | Uchibayashi | H04N 19/197 358/426.07 |
| 2005/0129325 | A1* | 6/2005 | Wu | H04N 7/144 382/254 |
| 2005/0232502 | A1* | 10/2005 | Fukushima | H04N 5/232 382/239 |
| 2006/0171460 | A1* | 8/2006 | Masuda | H04N 19/159 375/240.03 |
| 2007/0064800 | A1* | 3/2007 | Ha | H04N 19/597 375/240.12 |
| 2007/0237223 | A1* | 10/2007 | Lee | H04N 19/124 375/240.03 |
| 2007/0263720 | A1* | 11/2007 | He | H04N 19/124 375/240.03 |
| 2008/0089596 | A1* | 4/2008 | Choi | H04N 19/597 382/238 |
| 2008/0304762 | A1* | 12/2008 | Matsumoto | G06K 9/38 382/243 |
| 2009/0067738 | A1* | 3/2009 | Fuchie | H04N 19/176 382/251 |
| 2009/0148058 | A1* | 6/2009 | Dane | H04N 5/145 382/251 |
| 2010/0097470 | A1* | 4/2010 | Yoshida | H04N 5/232 348/159 |
| 2011/0064309 | A1* | 3/2011 | Sadasue | H04N 1/41 382/173 |
| 2012/0140036 | A1* | 6/2012 | Maruyama | H04N 9/8042 348/43 |
| 2012/0274741 | A1* | 11/2012 | Lee | H04N 13/139 348/43 |
| 2013/0114726 | A1* | 5/2013 | Maeda | H04N 19/597 375/240.16 |
| 2014/0341289 | A1* | 11/2014 | Schwarz | H04N 19/597 375/240.16 |
| 2016/0050423 | A1* | 2/2016 | Alshina | H04N 19/503 375/240.12 |
| 2017/0099487 | A1* | 4/2017 | Jun | H04N 19/124 |
| 2017/0127088 | A1* | 5/2017 | Choi | H04N 19/86 |
| 2017/0302938 | A1 | 10/2017 | Oto | |
| 2017/0310993 | A1* | 10/2017 | Nam | H04N 19/597 |
| 2018/0249163 | A1* | 8/2018 | Curcio | H04N 19/137 |
| 2019/0261243 | A1* | 8/2019 | Amini | H04L 1/0009 |

* cited by examiner

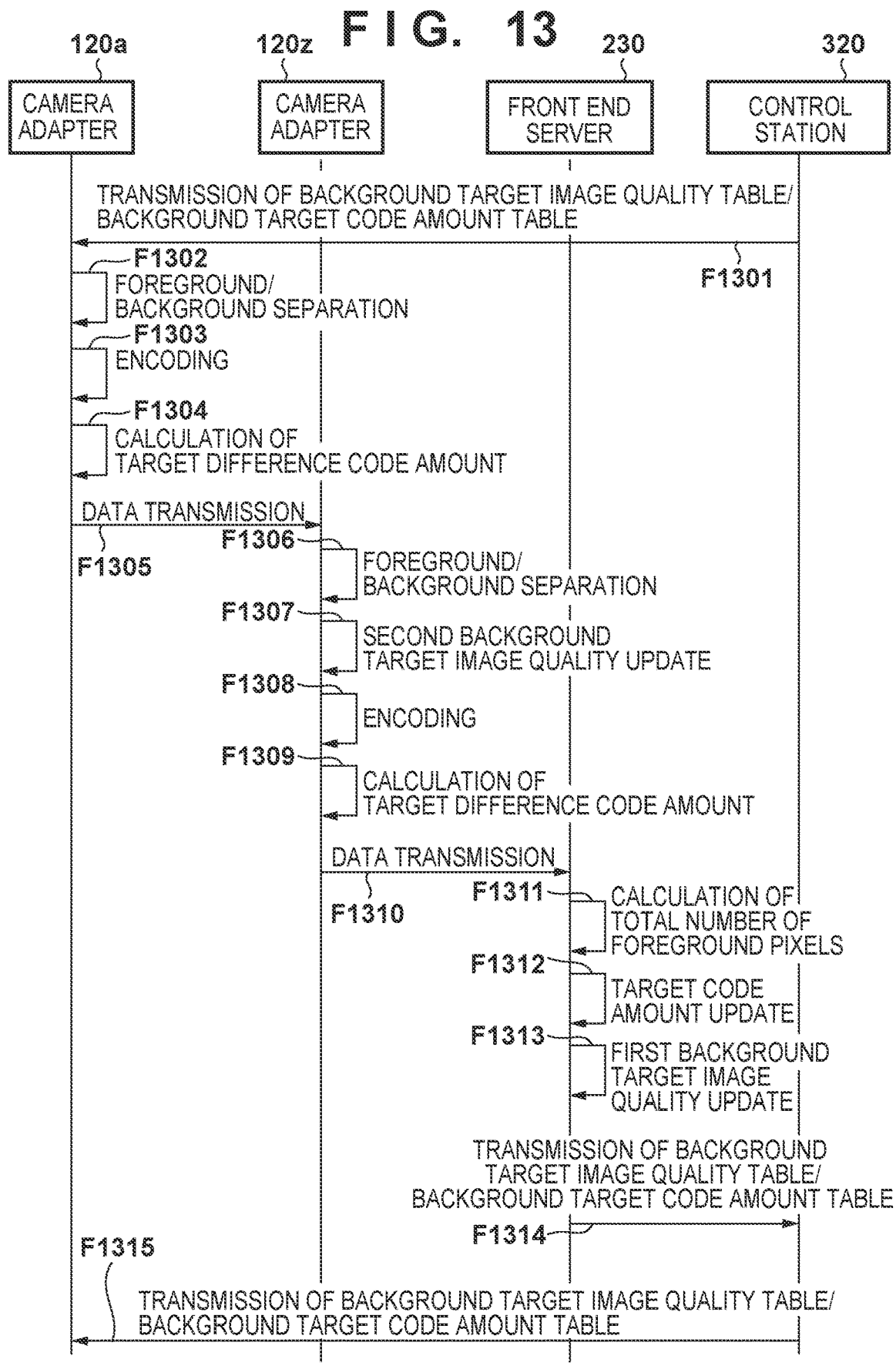

FIG. 14A

| View v \ Time t | | t-1 | t | t+1 |
|---|---|---|---|---|
| ... | ... | ⋮ | | |
| v-1 | | 36.8 | | |
| v | ... | 36.5 | | |
| v+1 | | 36.6 | | |
| ... | ... | ⋮ | | |

FIG. 14B

TARGET IMAGE QUALITY TABLE IMMEDIATELY AFTER FIRST TARGET IMAGE QUALITY UPDATE AT TIME t

| View v \ Time t | | t-1 | t | t+1 |
|---|---|---|---|---|
| ... | ... | ⋮ | ⋮ | |
| v-1 | | 36.8 → | 35.8 | |
| v | ... | 36.5 → | 35.5 | |
| v+1 | | 36.6 → | 35.6 | |
| ... | ... | ⋮ | ⋮ | |

FIG. 14C

TARGET IMAGE QUALITY TABLE IMMEDIATELY AFTER SECOND TARGET IMAGE QUALITY UPDATE AT TIME t AND VIEW-POINT v

| View v \ Time t | | t-1 | t | t+1 |
|---|---|---|---|---|
| ... | ... | ⋮ | ⋮ | |
| v-1 | | 36.8 | 35.8 | |
| v | ... | 36.5 | 35.3 | |
| v+1 | | 36.6 | 35.6 | |
| ... | ... | ⋮ | ⋮ | |

IMAGE PROCESSING APPARATUS, METHOD OF CONTROLLING THE SAME, NON-TRANSITORY COMPUTER-READABLE STORAGE MEDIUM, AND IMAGE PROCESSING SYSTEM

BACKGROUND OF THE INVENTION

Field of the Invention

The present invention relates to a technique of generating a virtual view-point image from captured images at a plurality of view-point positions.

Description of the Related Art

In these days, a technique of performing synchronous shooting at multi-view-points using a plurality of cameras placed at different positions and generating content of an image viewed from a virtual view-point (virtual view-point image) from a plurality of view-point images obtained by the shooting has received attention. According to the technique of generating virtual view-point content from the plurality of view-point images in the above-described way, for example, highlight scenes of a football or basketball game can be viewed from various angles. This can give a user a realistic feeling as compared to normal images.

On the other hand, when transmitting a video obtained by a camera via a network, a contrivance is needed so a code amount of the video does not exceed a network band. In SANO, NAITO, and WATANABE "Temporal bit allocation for low delay coding by using Motion JPEG2000", 2004AVM47-24, December 2004 (to be referred to as literature 1 hereinafter), there is disclosed a method of predicting a relationship between a distortion and a code amount of a subsequent frame from a plurality of encoded frames, and controlling the code amount dynamically by determining a bit truncation point. Moreover, in Japanese Patent Laid-Open No. 2004-32680 (to be referred to as literature 2 hereinafter), there is disclosed a method of controlling a frame rate so a total code amount of a plurality of monitoring camera videos does not exceed a band when connecting a plurality of monitoring cameras to a single network to transmit videos.

Virtual view-point content is generated by using videos at a plurality of view-points adjacent to a desired virtual view-point. At this time, if there is a large image quality difference between the plurality of view-point videos used for generation, the difference influences the image quality of the virtual view-point content. While it is possible to control a code amount in a time-axis direction by using a single independent camera in literature 1, the code amount is not controlled in consideration of image qualities between the plurality of view-points, causing a large image quality difference between cameras. While the frame rate is controlled in controlling the code amounts of a plurality of camera videos in literature 2, it becomes difficult to generate the virtual view-point content if videos of some cameras are lost. Moreover, in literature 2, if frame rates of all cameras are controlled to have a uniform value, realism of the virtual view-point content is deteriorated if the frame rates are set low.

SUMMARY OF THE INVENTION

The present invention has been made in consideration of the above-described problem, and provides a technique capable of controlling a code amount while suppressing image quality degradation of a virtual view-point image.

According to an aspect of the present invention, there is provided an image processing apparatus that operates in a system for generating a virtual view-point image based on shot images acquired by a plurality of image capturing devices, the image processing apparatus comprising: a reception unit configured to receive encoded image data from an image capturing device of interest as one of the plurality of image capturing devices; a determination unit configured to determine, based on an index value of an image quality which is represented by encoded image data received in the past from the image capturing device of interest by the reception unit and the index value of an image quality which is represented by encoded image data transmitted by another image capturing device different from the image capturing device of interest, a permissible range of a target image quality of a captured image obtained by an image capturing unit in the image capturing device of interest; and a setting unit configured to set, in an encoding unit of the image capturing device of interest, an encoding parameter according to an image quality in the permissible range determined by the determination unit.

According to the present invention, it becomes possible to control the control amount while suppressing image quality degradation of the virtual view-point image.

Further features of the present invention will become apparent from the following description of exemplary embodiments with reference to the attached drawings.

BRIEF DESCRIPTION OF THE DRAWINGS

FIG. 13 is a sequence chart showing code amount control according to the third embodiment; and FIGS. 14A to 14C are tables for explaining updates of target image quality according to the second and third embodiments.

DESCRIPTION OF THE EMBODIMENTS

Embodiments according to the present invention will be described in detail below with reference to the accompanying drawings.

First Embodiment

Figure 1:
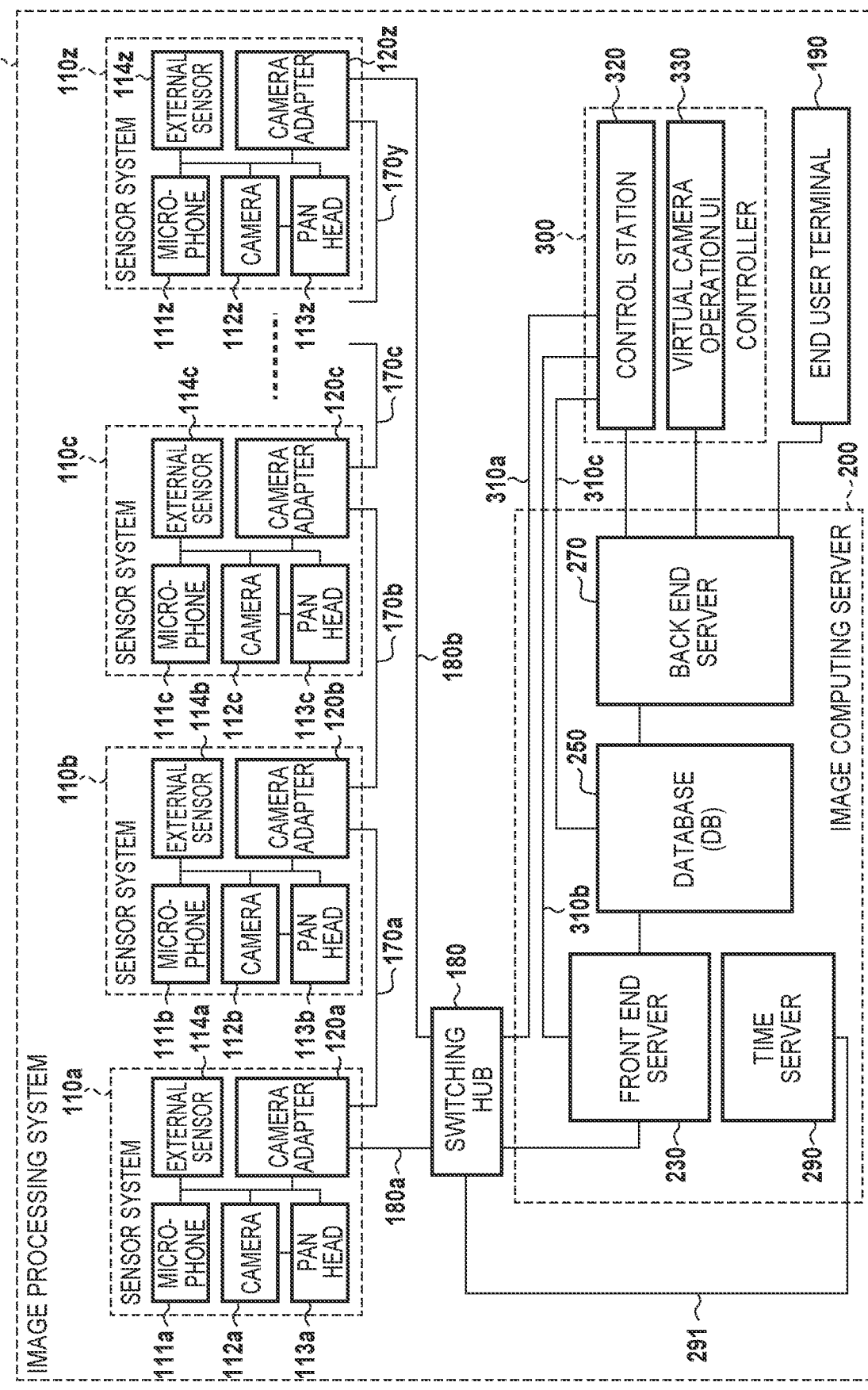
FIG. 1 is a block diagram for explaining the arrangement of an image processing system.

FIG. 1 is a block diagram showing the arrangement of an image processing system 100 that performs shooting and sound collection by placing a plurality of cameras and microphones in a facility such as an arena (stadium) or a concert hall. The image processing system 100 includes sensor systems 110a to 110z that function as image capturing devices, an image computing server 200, a controller 300, a switching hub 180, and an end user terminal 190. Note that although there is a difference in processing capability of an incorporated processor (CPU) between the image computing server 200, the controller 300, and the end user terminal 190, hardware arrangements thereof are the same as that of an information processing apparatus represented by a general personal computer.

The controller 300 includes a control station 320 and a virtual camera operation UI 330. The control station 320 performs management of operation states, parameter setting control, and the like for respective blocks included in the image processing system 100 via networks 310a to 310c, 180a, 180b, and 170a to 170y. Each network may be GbE (Gigabit Ethernet) or 10 GbE, which is Ethernet® complying with the IEEE standard, or may be formed by combining interconnect Infiniband, industrial Ethernet, and the like. The network is not limited to these, and may be a network of another type.

A process of transmitting 26 sets of images and audios obtained by the sensor systems 110a to 110z to the image computing server 200 via the sensor system 110z located at an end will be explained first. In the image processing system 100 according to this embodiment, the sensor systems 110a to 110z are connected by a daisy chain.

Any one of the 26 systems from the sensor system 110a to the sensor system 110z can be used unless specifically stated otherwise in the following description, and one of them will be denoted as a sensor system 110 if they are not distinguished. Similarly, constituent elements in the sensor system 110 will be denoted as a microphone 111, a camera 112, a pan head 113, an external sensor 114, and a camera adapter 120 without distinction unless specifically stated otherwise. Note that the number of sensor systems is 26. However, the number of sensor systems is merely an example and is not limited to this. Note that in this embodiment, a term "image" includes the concepts of both a moving image and a still image unless specifically stated otherwise. That is, the image processing system 100 according to this embodiment can process both a still image and a moving image. In this embodiment, an example in which virtual view-point content provided by the image processing system 100 includes both a virtual view-point image and a virtual hearing point sound will mainly be described. However, the present invention is not limited to this. For example, the virtual view-point content need not include an audio. Additionally, for example, the audio included in the virtual view-point content may be an audio collected by a microphone closest to the virtual view-point. In this embodiment, a description of an audio will partially be omitted for the sake of descriptive simplicity. Basically, an image and an audio are processed together.

The sensor systems 110a to 110z include single cameras 112a to 112z, respectively. That is, the image processing system 100 includes a plurality of cameras to shoot an object from a plurality of directions. The plurality of sensor systems 110 are connected to each other by a daisy chain as described above. It is specified here that this connection form has the effect of decreasing the number of connection cables and saving labor in a wiring operation when increasing the image data capacity along with an increase in a shot image resolution to 4K or 8K and an increase in the frame rate.

Note that the present invention is not limited to this, and as the connection form, the sensor systems 110a to 110z may be connected to the switching hub 180 to form a star network in which data transmission/reception among the sensor systems 110 is performed via the switching hub 180.

FIG. 1 shows an arrangement in which all the sensor systems 110a to 110z are cascade-connected so as to form a daisy chain. However, the present invention is not limited to this. For example, the plurality of sensor systems 110 may be divided into some groups, and the sensor systems 110 may be connected by a daisy chain in each divided group. The camera adapter 120 of the sensor system 110 at the end of a division unit may be connected to the switching hub to input an image to the image computing server 200. This arrangement is particularly effective in a stadium. For example, a case in which a stadium includes a plurality of floors, and the sensor system 110 is disposed in each floor can be considered. In this case, input to the image computing server 200 can be done in every floor or every half round of the stadium. Even in a place where wiring to connect all the sensor systems 110 by one daisy chain is difficult, the placement can be simplified, and the system can be made versatile.

Control of image processing in the image computing server 200 is switched depending on whether one camera adapter 120 or two or more camera adapters 120 are connected by a daisy chain to input images to the image computing server 200. That is, control is switched depending on whether the sensor systems 110 are divided into a plurality of groups. In a case in which one camera adapter 120 inputs images, since an all-round image of the arena is generated while transmitting images through the daisy chain connection, the timings that all-round image data are completely collected in the image computing server 200 are synchronized. That is, the timings are synchronized unless the sensor systems 110 are divided into groups.

However, in a case in which a plurality of camera adapters 120 input images (the sensor systems 110 are divided into groups), the delay may change between the lanes (routes) of daisy chains. It is therefore specified that image processing of a subsequent stage needs to be executed while checking collection of image data by synchronous control of establishing synchronization after the all-round image data are completely collected in the image computing server 200.

In this embodiment, the sensor system 110a includes a microphone 111a, the camera 112a, a pan head 113a, an external sensor 114a, and a camera adapter 120a. However, the present invention is not limited to this arrangement. The sensor system 110a need only include at least one camera adapter 120a and one camera 112a or one microphone 111a. Alternatively, for example, the sensor system 110a may be formed by one camera adapter 120a and the plurality of cameras 112a, or may be formed by one camera 112a and a plurality of camera adapters 120a. That is, the plurality of cameras 112 and the plurality of camera adapters 120 in the image processing system 100 are in an N-to-M (N and M are integers of 1 or more) correspondence. The sensor system 110 may include devices other than the microphone 111a, the camera 112a, the pan head 113a, and the camera adapter 120a. The camera 112 and the camera adapter 120 may be integrated. At least some functions of the camera adapter 120 may be imparted to a front end server 230. In this embodiment, the sensor systems 110b to 110z will not be described since they have the same arrangement as the sensor system 110a. Note that the sensor systems 110b to 110z need not have the same arrangement as the sensor system 110a, and the arrangement may change between the sensor systems 110.

An audio collected by the microphone 111a and an image shot by the camera 112a undergo image processing (to be described later) by the camera adapter 120a and are then transmitted to a camera adapter 120b of the sensor system 110b via the daisy chain 170a. Similarly, the sensor system 110b transmits a collected audio and shot image to the sensor system 110c together with the image and the audio acquired from the sensor system 110a.

When the above-described operation is continued, the images and audios acquired by the sensor systems 110a to 110z are transmitted from the sensor system 110z to the switching hub 180 by using the network 180b, and then transmitted to the image computing server 200.

Note that in this embodiment, the cameras 112a to 112z are separated from the camera adapters 120a and 120b, and camera adapters 120c to 120z. However, the camera and the camera adapter may be integrated in a single housing. In this case, the microphone 111a and microphones 111b to 111z may be incorporated in the integrated camera 112 or may be connected to the outside of the camera 112.

The arrangement and operation of the image computing server 200 will be described next. The image computing server 200 according to this embodiment processes data acquired from the sensor system 110z. The image computing server 200 includes the front end server 230, a database 250 (to be also referred to as a DB hereinafter), a back end server 270, and a time server 290.

The time server 290 has a function of distributing a time and synchronization signal, and distributes a time and synchronization signal to the sensor systems 110a to 110z via the switching hub 180. Upon receiving the time and synchronization signal, the camera adapters 120a to 120z perform image frame synchronization by genlocking the cameras 112a to 112z based on the time and synchronization signal. That is, the time server 290 synchronizes the shooting timings of the plurality of cameras 112. Accordingly, since the image processing system 100 can generate, based on the plurality of images shot at the same timing, a virtual view-point image viewed at a set virtual view-point position and in a set line-of-sight direction, lowering of the quality of the virtual view-point image caused by the shift of shooting timings can be suppressed. Note that in this embodiment, the time server 290 manages the time synchronization of the plurality of cameras 112. However, the present invention is not limited to this, and the cameras 112 or camera adapters 120 may independently perform processing for the time synchronization.

The front end server 230 receives images and audios acquired by the sensor systems 110a to 110z from the sensor system 110z at the end of a daisy chain. Then, the front end server 230 restores a received segmented transmission packet, converts the packet to image data and audio data, and writes them in the database 250 in association with a camera identifier, data type, and frame number. Note that this database 250 stores, in advance, camera information concerning the placement position, orientation, and focus of each camera of the sensor systems 110a to 110z.

Next, the back end server 270 receives a view-point designation from the virtual camera operation UI 330, reads out corresponding image data, audio data, and camera information from the database 250 based on the received view-point, and performs rending processing, thereby generating a virtual view-point image.

Note that the arrangement of the image computing server 200 is not limited to this. For example, at least two of the front end server 230, the database 250, and the back end server 270 may be integrated. In addition, at least one of the front end server 230, the database 250, and the back end server 270 may include a plurality of devices. A device other than the above-described devices may be included at an arbitrary position in the image computing server 200. Furthermore, at least some of the functions of the image computing server 200 may be imparted to the end user terminal 190 or the virtual camera operation UI 330.

The virtual view-point image created by rendering processing is transmitted from the back end server 270 to the end user terminal 190, and displayed. As a result, the user who operates the end user terminal 190 can view the image and listen to the audio according to the view-point designated by the controller 300. That is, the back end server 270 generates virtual view-point content based on the images (the plurality of view-point images) shot by the plurality of cameras 112 and view-point information. More specifically, the back end server 270 generates one or more virtual view-point contents based on, for example, image data of a predetermined region extracted by the plurality of camera adapters 120 from the images shot by the plurality of cameras 112, and the view-point designated by the user operation of the controller 300. Then, the back end server 270 provides the generated virtual view-point content to the end user terminal 190. Extraction of the predetermined region by the camera adapter 120 will be described in detail later. The virtual view-point content according to this embodiment is content including a virtual view-point image as an image obtained when an object is shot from a virtual view-point. In other words, the virtual view-point image can be said to be an image representing a "sight" from a designated view-point. The virtual view-point may be designated by the user or may automatically be designated based on a result of image analysis or the like. That is, the virtual view-point image includes an arbitrary view-point image (free-view-point image) corresponding to a view-point arbitrarily designated by the user. The virtual view-point image also includes an image corresponding to a view-point designated by the user from a plurality of candidates or an image corresponding to a view-point automatically designated by the device. Note that in this embodiment, an example in which virtual view-point content includes audio data will mainly be described. However, audio data need not always be included. The back end server 270 may compression-code the virtual view-point image by a standard technique represented by H.264 or HEVC and then transmit the virtual view-point image to the end user terminal 190 using the MPEG-DASH protocol. The virtual view-point image may be transmitted to the end user terminal 190 in a non-compressed state. In particular, the end user terminal 190 is assumed to be a smartphone or a tablet in the former case in which compression encoding is performed, and is assumed to be a display capable of displaying a non-compressed image in the latter case. That is, it is specified that the image format can be switched in accordance with the type of the end user terminal 190. The image transmission protocol is not limited to MPEG-DASH. For example, HLS (HTTP Live Streaming) or any other transmission method is usable.

As described above, the image processing system 100 includes three functional domains, that is, a video collection domain, a data storage domain, and a video generation domain. The video collection domain includes the sensor systems 110a to 110z, the data storage domain includes the database 250, the front end server 230, and the back end server 270, and the video generation domain includes the virtual camera operation UI 330 and the end user terminal 190. Note that the arrangement is not limited to this. For example, the virtual camera operation UI 330 can also directly acquire images from the sensor systems 110a to 110z. In this embodiment, however, not the method of directly acquiring images from the sensor systems 110a to 110z but the method of arranging the data storage function midway is employed. More specifically, the front end server 230 converts image data and audio data generated by the sensor systems 110a to 110z and meta information of these data into a common schema and data type of the database 250. Accordingly, even if the cameras 112 of the sensor systems 110a to 110z change to cameras of another type, the difference caused by the change can be absorbed by the front end server 230, and the data can be registered in the database 250. This can reduce the fear that the virtual camera operation UI 330 does not appropriately operate in a case in which the cameras 112 change to cameras of another model.

In addition, the virtual camera operation UI 330 is configured to access the database 250 not directly but via the back end server 270. Common processing associated with image generation processing is performed by the back end server 270, and the difference portion of the application associated with the operation UI is performed by the virtual camera operation UI 330. Hence, when developing the virtual camera operation UI 330, the developer can concentrate on developing a UI operation device or functional requirements of a UI that operates a virtual view-point image to be generated. In addition, the back end server 270 can also add or delete common processing associated with image generation processing in accordance with a request of the virtual camera operation UI 330. This enables flexibly coping with a request of the virtual camera operation UI 330.

The image processing system 100 according to the embodiment includes the plurality of cameras 112 configured to shoot an object from the plurality of directions. Then, the back end server 270 thus generates a virtual view-point image based on image data based on shooting by these cameras. Note that the image processing system 100 according to this embodiment is not limited to the above-described physical arrangement and may have a logical arrangement.

Functional block diagrams of respective nodes (the camera adapter 120, the front end server 230, the database 250, the back end server 270, the virtual camera operation UI 330, and the end user terminal 190) in the system shown in FIG. 1 will be described next.

Figure 2:
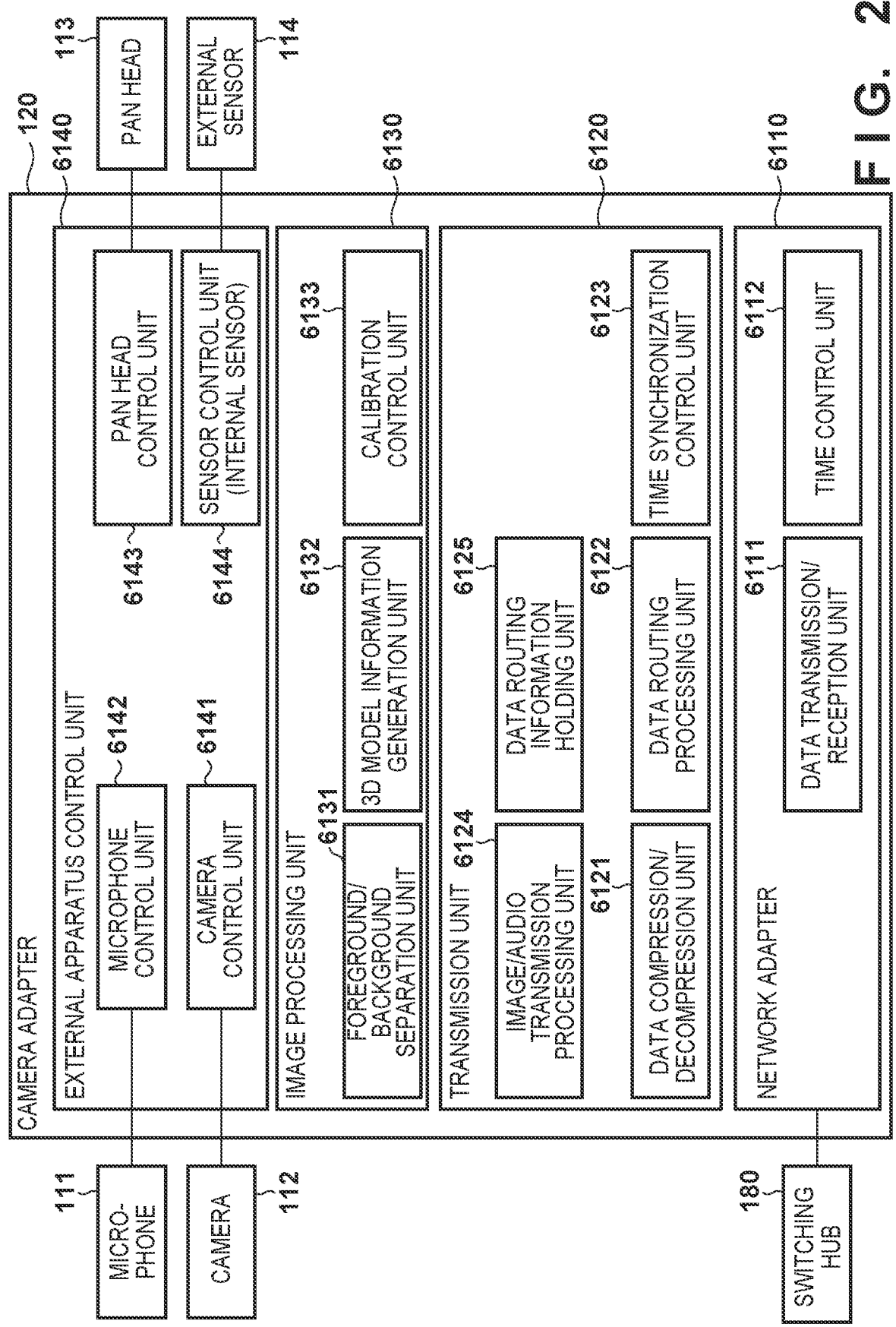
FIG. 2 is a block diagram for explaining the functional arrangement of a camera adapter.

The functional blocks of the camera adapter 120 according to this embodiment will be described with reference to FIG. 2.

The camera adapter 120 includes a network adapter 6110, a transmission unit 6120, an image processing unit 6130, and an external apparatus control unit 6140. The network adapter 6110 includes a data transmission/reception unit 6111 and a time control unit 6112.

The data transmission/reception unit 6111 executes data communication with another camera adapter 120, the front end server 230, the time server 290, and the control station 320 via a daisy chain 170, a network 291, and a network 310. For example, the data transmission/reception unit 6111 outputs a foreground image and a background image separated by a foreground/background separation unit 6131 from an image shot by the camera 112 to the other camera adapter 120. The camera adapter 120 of an output destination is, out of the camera adapters 120 in the image processing system 100, the next camera adapter 120 in an order predetermined in accordance with a process by a data routing processing unit 6122. The respective camera adapters 120 output foreground images and background images, generating a virtual view-point image based on the foreground images and background images shot from a plurality of view-points. Note that the camera adapter 120 may exist, which outputs a foreground image and does not output a background image separated from a shot image.

The time control unit 6112 performs, for example, a function of complying with Ordinary Clock of the IEEE1588 standard and storing a time stamp of data transmitted/received to/from the time server 290, and time synchronization with the time server 290. Note that the present invention is not limited to the IEEE1588, and time synchronization with the time server may be implemented by another EtherAVB standard or a proprietary protocol. In this embodiment, a NIC (Network Interface Card) is used as the network adapter 6110. However, the present invention is not limited to the NIC, and another similar interface may be used. In addition, the IEEE1588 is updated as a standard specification as the IEEE1588-2002 or the IEEE 1588-2008, and the latter is also called PTPv2 (Precision Time Protocol Version 2).

The transmission unit 6120 has a function of controlling data transmission to the switching hub 180 or the like via the network adapter 6110 and is formed by the following functional units.

A data compression/decompression unit 6121 has a function of performing compression (encoding) that applies a predetermined compression method, compression ratio, and frame rate to data transmitted/received via the data transmission/reception unit 6111, and a function of decompressing (decoding) the compressed data.

The data routing processing unit 6122 uses data held by a data routing information holding unit 6125 (to be described later), and determines a routing destination of data received by the data transmission/reception unit 6111 and data processed by the image processing unit 6130. Furthermore, the data routing processing unit 6122 has a function of transmitting data to the determined routing destination. Using, as the routing destination, the camera adapter 120 corresponding to the camera 112 focused on the same gaze point is suitable for performing image processing because of a high image frame correlation between the respective cameras 112. In accordance with a decision by each data routing processing unit 6122 of the plurality of camera adapters 120, the order of the camera adapters 120 that output foreground images and background images in a relay format in the image processing system 100 is determined.

A time synchronization control unit 6123 has a function of complying with a PTP (Precision Time Protocol) of the IEEE1588 standard and performing a process associated with time synchronization with the time server 290. Note that the present invention is not limited to the PTP, and time synchronization may be performed by using any other protocol of the same type.

An image/audio transmission processing unit 6124 has a function of creating a message for transferring image data or audio data to the other camera adapter 120 or front end server 230 via the data transmission/reception unit 6111. The message includes image data or audio data and meta information of the data. The meta information according to this embodiment includes a time code or sequence number obtained when shooting an image or sampling an audio, a data type, and an identifier indicating the individual of the camera 112 or the microphone 111. Note that image data or audio data to be transmitted may be compressed by the data compression/decompression unit 6121. The image/audio transmission processing unit 6124 receives a message from the other camera adapter 120 via the data transmission/reception unit 6111. Then, in accordance with a data type included in the message, data information fragmented to a packet size defined by a transmission protocol is restored to image data or audio data. Note that if data is compressed when restoring the data, the data compression/decompression unit 6121 performs decompression processing.

The data routing information holding unit 6125 has a function of holding address information for determining a transmission destination of data transmitted/received by the data transmission/reception unit 6111. A routing method will be described later.

The image processing unit 6130 has a function of performing, by the control of a camera control unit 6141, a process on image data shot by the camera 112 and image data received from the other camera adapter 120, and is formed by the following functional units.

Figure 8A:
FIGS. 8A to 8D are conceptual views for explaining foreground images and a background image.
Figure 8B:
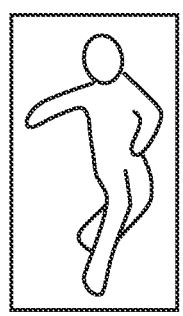
Figure 8C:
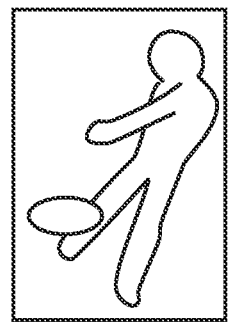
Figure 8D:
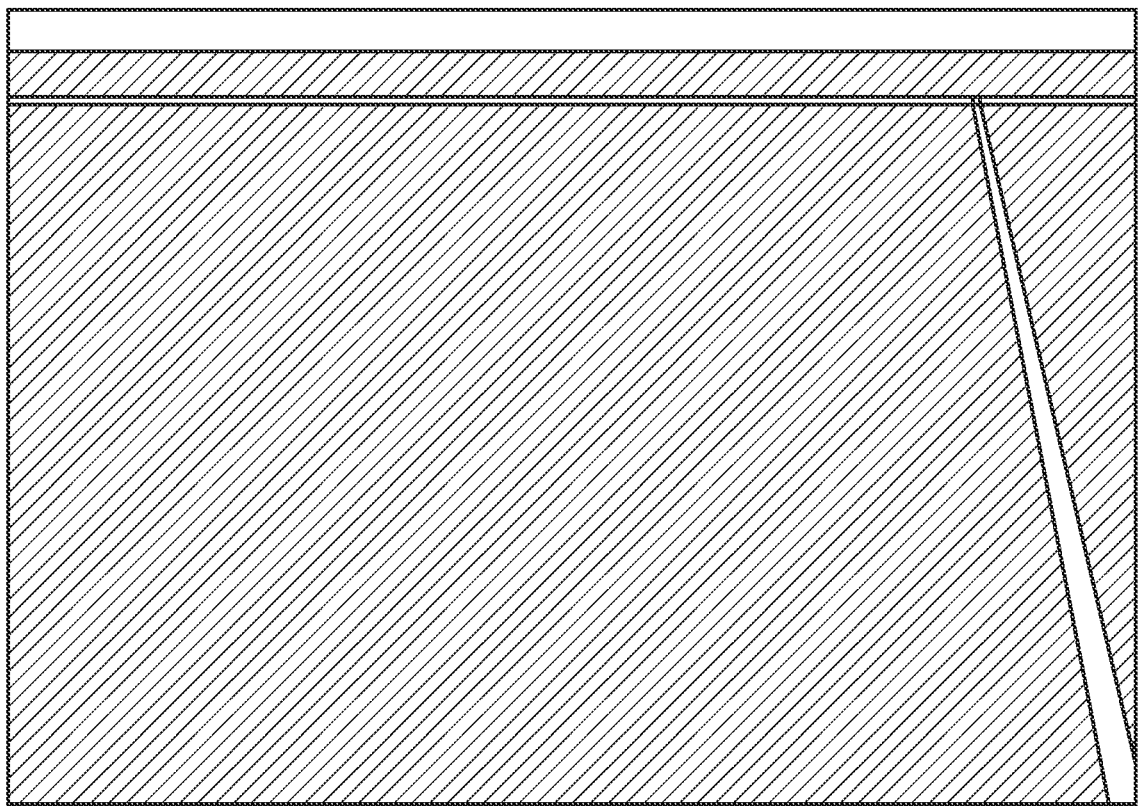

The foreground/background separation unit 6131 has a function of separating image data shot by the camera 112 into a foreground image and a background image. That is, each foreground/background separation unit 6131 of the plurality of camera adapters 120 extracts a predetermined region from an image shot by the corresponding camera 112 out of the plurality of cameras 112. The predetermined region is, for example, the foreground image obtained as a result of object detection from the shot image. With this extraction, the foreground/background separation unit 6131 separates the shot image into a foreground image and a background image. Note that the object is, for example, a person. However, the object may be a specific person (a player, a coach, and/or a referee) or an object such as a ball or goal with a predetermined image pattern. A moving body may be detected as the object. For example, foreground images including an important object such as a person as shown in FIGS. 8A to 8C and a background image that does not include such an object as shown in FIG. 8D can be separated and processed. Consequently, the quality of the image of a portion corresponding to the object in a virtual view-point image generated by the image processing system 100 can be improved. In addition, when the separation of the foreground images and the background image is performed by each of the plurality of camera adapters 120, the load in the image processing system 100 including the plurality of cameras 112 can be distributed. Note that the predetermined region is not limited to the foreground image, and may be, for example, the background image.

A 3D model information generation unit 6132 has a function of, for example, generating image information concerning a 3D model using the principle of a stereo camera by using the foreground image separated by the foreground/background separation unit 6131 and a foreground image received from the other camera adapter 120.

A calibration control unit 6133 has a function of acquiring image data needed for calibration from the camera 112 via the camera control unit 6141 and transmitting the acquired data to the front end server 230 that performs arithmetic processing concerning calibration. Note that in this embodiment, the front end server 230 performs the arithmetic processing concerning calibration. However, a node that performs the arithmetic processing is not limited to the front end server 230. For example, another node such as the control station 320 or the camera adapter 120 (including the other camera adapter 120) may perform the arithmetic processing. The calibration control unit 6133 also has a function of performing calibration (dynamic calibration) during shooting in accordance with a preset parameter on image data acquired from the camera 112 via the camera control unit 6141.

The external apparatus control unit 6140 has a function of controlling an apparatus connected to the camera adapter 120 and is formed by functional blocks to be described below.

The camera control unit 6141 has a function of performing connection to the camera 112 to, for example, control the camera 112, acquire a shot image, provide a synchronization signal, and perform time setting. The control of the camera 112 includes, for example, the setting of and reference to shooting parameters (such as the setting of the number of pixels, a color depth, a frame rate, and white balance), acquisition of the states (during shooting, during halts, during synchronization, an error, and the like), the start and end of shooting, focus adjustment, and the like. Note that in this embodiment, focus adjustment is performed via the camera 112. If an interchangeable lens is mounted on the camera 112, however, the camera adapter 120 is connected to the lens to adjust the lens directly. Alternatively, the camera adapter 120 may perform lens adjustment such as zooming via the camera 112. The synchronization signal is provided by providing a shooting timing (control clock) to the camera 112 by using time at which the time synchronization control unit 6123 synchronizes with the time server 290. Time is set such that the time at which the time synchronization control unit 6123 synchronizes with the time server 290 is provided with a time code complying with, for example, the format of SMPTE12M. This assigns a time code which is provided to image data received from the camera 112. Note that the format of the time code is not limited to SMPTE12M and may be another format. Alternatively, the camera control unit 6141 itself may assign the time code to the image data received from the camera 112 without providing a time code for the camera 112.

A microphone control unit 6142 has a function of performing connection to the microphone 111 to, for example, control the microphone 111, start and stop sound collection, and acquire collected audio data. The control of the microphone 111 includes, for example, gain adjustment, state acquisition, and the like. Similarly to the camera control unit 6141, the microphone control unit 6142 also provides a timing and a time code to perform audio sampling on the microphone 111. As clock information serving as a timing for audio sampling, time information from the time server 290 is converted into, for example, a 48-KHz word clock and supplied to the microphone 111.

A pan head control unit 6143 has a function of performing connection to the pan head 113 to control the pan head 113. The control of the pan head 113 includes, for example, pan/tilt control, state acquisition, and the like.

A sensor control unit 6144 has a function of performing connection to the external sensor 114 to acquire sensor information sensed by the external sensor 114. If, for example, a gyro sensor is used as the external sensor 114, it is possible to acquire information representing a vibration. Then, using vibration information acquired by the sensor control unit 6144, the image processing unit 6130 can generate an image with a suppressed vibration before a process by the foreground/background separation unit 6131. The vibration information is used when, for example, image data by an 8K camera is extracted with a size smaller than an original 8K size in consideration of the vibration information and used to perform alignment with an image by the camera 112 placed in a neighborhood. Consequently, even if a framework vibration of a building propagates through the respective cameras at different frequencies, alignment is performed by this function provided in the camera adapter 120. As a result, it is possible to generate image data having undergone electronic anti-vibration processing and obtain an effect of reducing a processing load of alignment by the number of cameras 112 in the image computing server 200. Note that the sensor of the sensor system 110 is not limited to the external sensor 114, and the same effect is also obtained by a sensor incorporated in the camera adapter 120.

Figure 3:
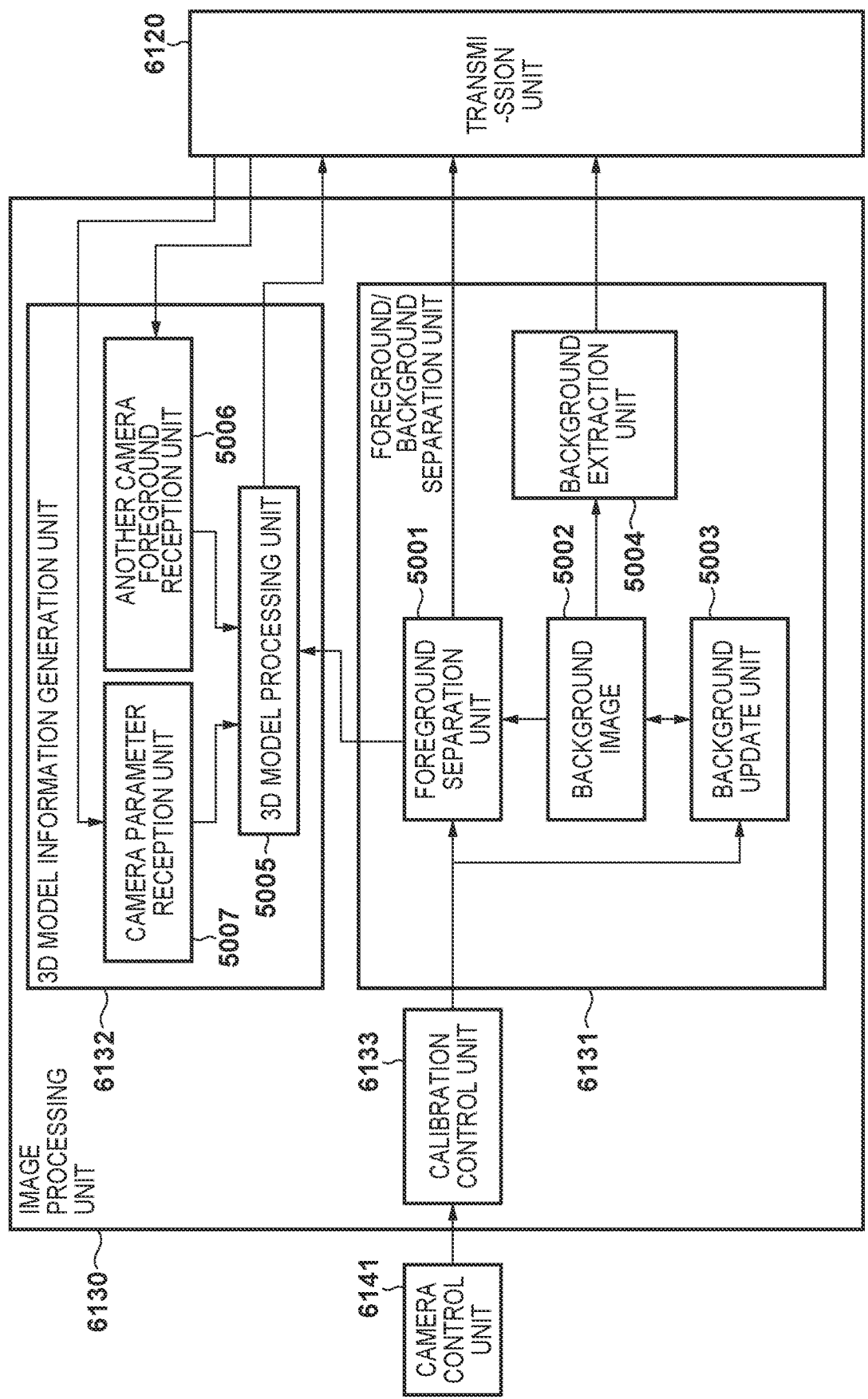
FIG. 3 is a block diagram for explaining the arrangement of an image processing unit.

FIG. 3 is a functional block diagram of the image processing unit 6130 inside the camera adapter 120. The calibration control unit 6133 performs, on an input image, color correction processing for suppressing a variation in color for each camera, blur correction processing (electronic anti-vibration processing) for stabilizing the position of an image with respect to a blur caused by the vibration of the camera, and the like.

Functional blocks of the foreground/background separation unit 6131 will be described. A foreground separation unit 5001 performs, on image data aligned with respect to an image by the camera 112, separation processing for a foreground image by comparison with a background image 5002. A background update unit 5003 generates a new background image by using an image that has undergone alignment between the background image 5002 and the camera 112, and updates the background image 5002 to the new background image. A background extraction unit 5004 performs control of extracting a part of the background image 5002.

The function of the 3D model information generation unit 6132 will be described here. A 3D model processing unit 5005 sequentially generates image information concerning a 3D model from, for example, the principle of a stereo camera or the like by using the foreground image separated by the foreground separation unit 5001 and the foreground image by the other camera 112 received via the transmission unit 6120. Another camera foreground reception unit 5006 receives a foreground image that has undergone foreground/background separation by the other camera adapter 120.

A camera parameter reception unit 5007 receives an internal parameter (a focal length, an image center, a lens distortion parameter, and the like) unique to a camera, and an external parameter (a rotation matrix, a position vector, and the like) representing the position and orientation of the camera. These parameters are information obtained by calibration processing (to be described later), and transmitted to and set for the targeted camera adapter 120 from the control station 320. Next, the 3D model processing unit 5005 generates 3D model information by the camera parameter reception unit 5007 and the other camera foreground reception unit 5006.

Figure 4:
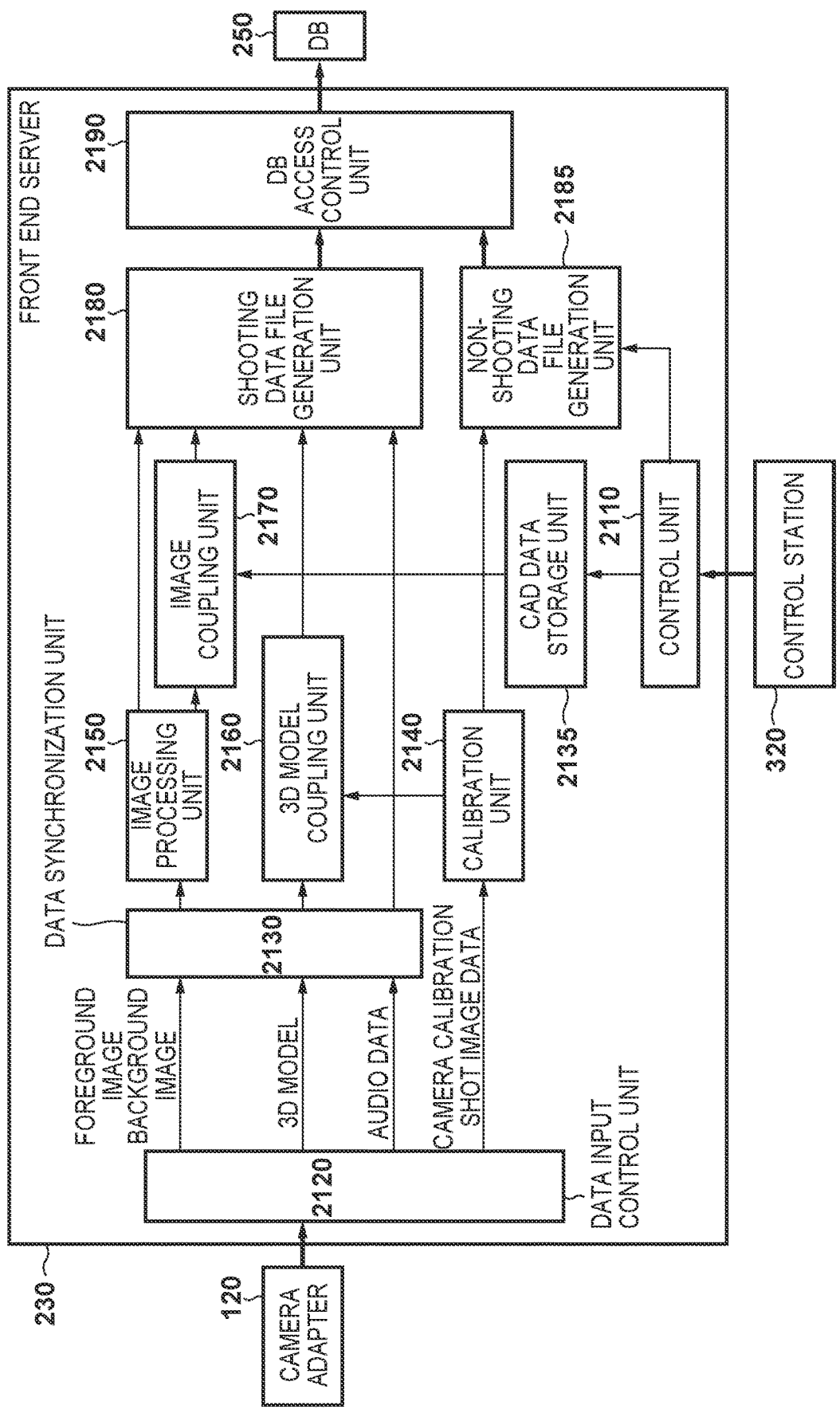
FIG. 4 is a block diagram for explaining the functional arrangement of a front end server.

FIG. 4 is a diagram showing functional blocks of the front end server 230. A control unit 2110 is formed by hardware, for example, a CPU, a DRAM, a storage medium such as an HDD or a NAND memory that stores program data and various data, and Ethernet®. Then, the control unit 2110 controls the respective functional blocks of the front end server 230 and the entire system of the front end server 230. The control unit 2110 also controls a mode to switch operation modes of a calibration operation, a preparation operation before shooting, an operation during shooting, and the like. The control unit 2110 also receives a control instruction from the control station 320 via Ethernet® and switches respective modes, inputs/outputs data, or the like. The control unit 2110 also acquires stadium CAD data (stadium shape data) from the control station 320 via a network in the same manner, and transmits the stadium CAD data to a CAD data storage unit 2135 and a shooting data file generation unit 2180. Note that the stadium CAD data (stadium shape data) in this embodiment is 3D data indicating the shape of a stadium and is not limited to a CAD format as long as the data represents a mesh model or another 3D shape.

A data input control unit 2120 is network-connected to the camera adapter 120 via the switching hub 180 and a communication path such as Ethernet®. Then, the data input control unit 2120 acquires a foreground image, a background image, a 3D model of an object, audio data, and camera calibration shot image data from the camera adapter 120 via a network. Note that the foreground image is image data based on a foreground region of a shot image to generate a virtual view-point image, and the background image is image data based on a background region of the shot image. In accordance with a result of a process of detecting a predetermined object for an image shot by the camera 112, the camera adapter 120 specifies the foreground region and the background region, and generates the foreground image and the background image. The predetermined object is, for example, a person. Note that the predetermined object may be a specific person (a player, a coach, and/or a referee). Alternatively, the predetermined object may include object such as a ball or goal with a predetermined image pattern. A moving body may be detected as the predetermined object.

The data input control unit 2120 also transmits the acquired foreground image and background image to a data synchronization unit 2130, and transmits camera calibration shot image data to a calibration unit 2140. The data input control unit 2120 also has a function of performing compression/decompression of received data, data routing processing, and the like. Both the control unit 2110 and the data input control unit 2120 have a communication function by a network such as Ethernet®. However, they may share the communication function. In this case, a method of receiving an instruction by a control command and the stadium DAC data from the control station 320 with the data input control unit 2120 and transmitting them to the control unit 2110 may be used.

The data synchronization unit 2130 temporarily stores the data acquired from the camera adapter 120 on the DRAM, and buffers the data until the foreground image, the background image, the audio data, and the 3D model data are collected completely. Note that the foreground image, the background image, the audio data, and the 3D model data will altogether be referred to as shooting data hereinafter. Meta information such as routing information, time code information (time information), and a camera identifier is assigned to the shooting data, and the data synchronization unit 2130 confirms a data attribute based on this meta information. Consequently, the data synchronization unit 2130 determines that, for example, data are obtained at the same time and confirms that data are collected completely. This is because the order in which network packets are received is not guaranteed for data transferred from the respective camera adapters 120 by a network, and buffering needs to be performed until data needed for file generation are collected completely. Once the data are collected completely, the data synchronization unit 2130 transmits the foreground image and the background image to an image processing unit 2150, the 3D model data to a 3D model coupling unit 2160, and the audio data to the shooting data file generation unit 2180. Note that the data collected completely here are data needed to generate a file in the shooting data file generation unit 2180 (to be described later). The background image may be shot at a frame rate different from that for the foreground image. For example, one background image is acquired per sec. if the frame rate of the background image is 1 fps, and it can therefore be assumed that all data are collected completely without any background image for a time in which no background image is acquired. If a predetermined time has elapsed, and the data are not collected completely, the data synchronization unit 2130 notifies the database 250 of information indicating that the data cannot be collected. Then, the database 250 of the subsequent stage stores information indicating missing data together with a camera number and a frame number when storing data. This makes it possible, in accordance with a view-point instruction from the virtual camera operation UI 330 to the back end server 270, to automatically notify whether it is possible to form a desired image from an image shot by the camera 112 with the collected data before rendering. As a result, it is possible to reduce a visual observation load of an operator of the virtual camera operation UI 330.

The CAD data storage unit 2135 stores 3D data indicating a stadium shape received from the control unit 2110 in the DRAM, or the storage medium such as the HDD or the NAND memory. Then, the CAD data storage unit 2135 transmits, to an image coupling unit 2170, stadium shape data stored when receiving a request for the stadium shape data.

The calibration unit 2140 performs a calibration operation of a camera and transmits a camera parameter obtained by calibration to a non-shooting data file generation unit 2185 (to be described later). Simultaneously, the calibration unit 2140 also holds the camera parameter in its own storage area and provides camera parameter information to the 3D model coupling unit 2160 (to be described later).

The image processing unit 2150 performs, on the foreground image and the background image, matching of colors or luminance values among the cameras, a development process when RAW image data is input, and a process of complementing an error, correcting a lens distortion of each camera, or the like in image decoding. Then, the image processing unit 2150 transmits a foreground image to the shooting data file generation unit 2180 and a background image to the image coupling unit 2170, which images have undergone image processing.

The 3D model coupling unit 2160 couples 3D model data acquired at the same time from the camera adapters 120 by using a camera parameter generated by the calibration unit 2140. Then, 3D model data of the foreground image in the entire stadium is generated by using a method called VisualHull. The generated 3D model is transmitted to the shooting data file generation unit 2180.

The image coupling unit 2170 acquires a background image from the image processing unit 2150, acquires 3D shape data (stadium shape data) of a stadium from the CAD data storage unit 2135, and specifies the position of the background image with respect to coordinates of the acquired 3D shape data of the stadium. If the position with respect to the coordinates of the 3D shape data of the stadium for each background image can be specified, the image coupling unit 2170 couples the background images to obtain one background image. Note that the back end server 270 may create 3D shape data of this background image.

The shooting data file generation unit 2180 acquires a background image coupled to the audio data from the data synchronization unit 2130, the foreground image from the image processing unit 2150, the 3D model data from the 3D model coupling unit 2160, and the 3D shape from the image coupling unit 2170. Then, the shooting data file generation unit 2180 outputs these acquired data to a DB access control unit 2190. Note that the shooting data file generation unit 2180 outputs these data in association with each other based on respective pieces of time information. However, some of these data may be output in association with each other. For example, the shooting data file generation unit 2180 outputs the foreground image and the background image in association with each other based on the time information of the foreground image and the time information of the background image. Alternatively, for example, the shooting data file generation unit 2180 outputs the foreground image, the background image, and the 3D model data in association with each other based on the time information of the foreground image, the time information of the background image, and the time information of the 3D model data. Note that the shooting data file generation unit 2180 may convert the associated data into a file for each data type and output the data or summarize and convert a plurality of types of data for respective times indicated by the pieces of time information into files, and output the data. The DB access control unit 2190 outputs shooting data thus associated with each other to the database 250, allowing the back end server 270 to generate a virtual view-point image from the foreground image and the background image having corresponding time information.

Note that if the frame rates of the foreground image and background image acquired by the data input control unit 2120 are different, it is difficult for the shooting data file generation unit 2180 to always output a foreground image and a background image obtained at the same time in association with each other. Therefore, the shooting data file generation unit 2180 outputs, in association with a foreground image, a background image having time information which is in a relationship based on a predetermined rule with time information of the foreground image. Note that the background image having the time information which is in the relationship based on the predetermined rule with the time information of the foreground image is, for example, a background image having time information closest to the time information of the foreground image out of background images acquired by the shooting data file generation unit 2180. By thus associating the foreground image and the background image based on the predetermined rule, it is possible to generate a virtual view-point image from a foreground image and background image shot at times close to each other even if the frame rates of the foreground image and background image are different. Note that a method of associating a foreground image and a background image with each other is not limited to the above-described method. For example, the background image having the time information which is in the relationship based on the predetermined rule with the time information of the foreground image may be a background image having time information closest to the time information of the foreground image out of acquired background images having time information corresponding to time before that of the foreground image. According to this method, it is possible to output a foreground image and a background image associated with each other with a small delay without waiting for acquisition of a background image having a lower frame rate than a foreground image. The background image having the time information which is in the relationship based on the predetermined rule with the time information of the foreground image may be a background image having time information closest to the time information of the foreground image out of acquired background images having time information corresponding to time after that of the foreground image.

The non-shooting data file generation unit 2185 acquires a camera parameter from the calibration unit 2140 and 3D shape data of the stadium from the control unit 2110, forms them in accordance with a file format, and then transmits them to the DB access control unit 2190. Note that the camera parameter or stadium shape data serving as data input to the non-shooting data file generation unit 2185 is formed individually in accordance with the file format. That is, if the non-shooting data file generation unit 2185 receives one of these data, it transmits them to the DB access control unit 2190 individually.

The DB access control unit 2190 is connected to the database 250 to be able to perform communication at a high speed by InfiniBand or the like. Then, the DB access control unit 2190 transmits files received from the shooting data file generation unit 2180 and non-shooting data file generation unit 2185 to the database 250. In this embodiment, shooting data associated by the shooting data file generation unit 2180 based on time information is output, via the DB access control unit 2190, to the database 250 serving as a storage device connected to the front end server 230 via a network. However, an output destination of the associated shooting data is not limited to this. For example, the front end server 230 may output the shooting data associated with each other based on the time information to the back end server 270 serving as an image generating apparatus which is connected to the front end server 230 via a network and generates a virtual view-point image. Alternatively, the front end server 230 may output the shooting data to both the database 250 and the back end server 270.

In this embodiment, the front end server 230 associates a foreground image and a background image with each other. However, the present invention is not limited to this, and the database 250 may associate them with each other. For example, the database 250 acquires a foreground image and a background image each having time information from the front end server 230. Then, the database 250 may associate the foreground image and the background image with each other based on the time information of the foreground image and the time information of the background image, and output them to a storage unit of the database 250.

Figure 5:
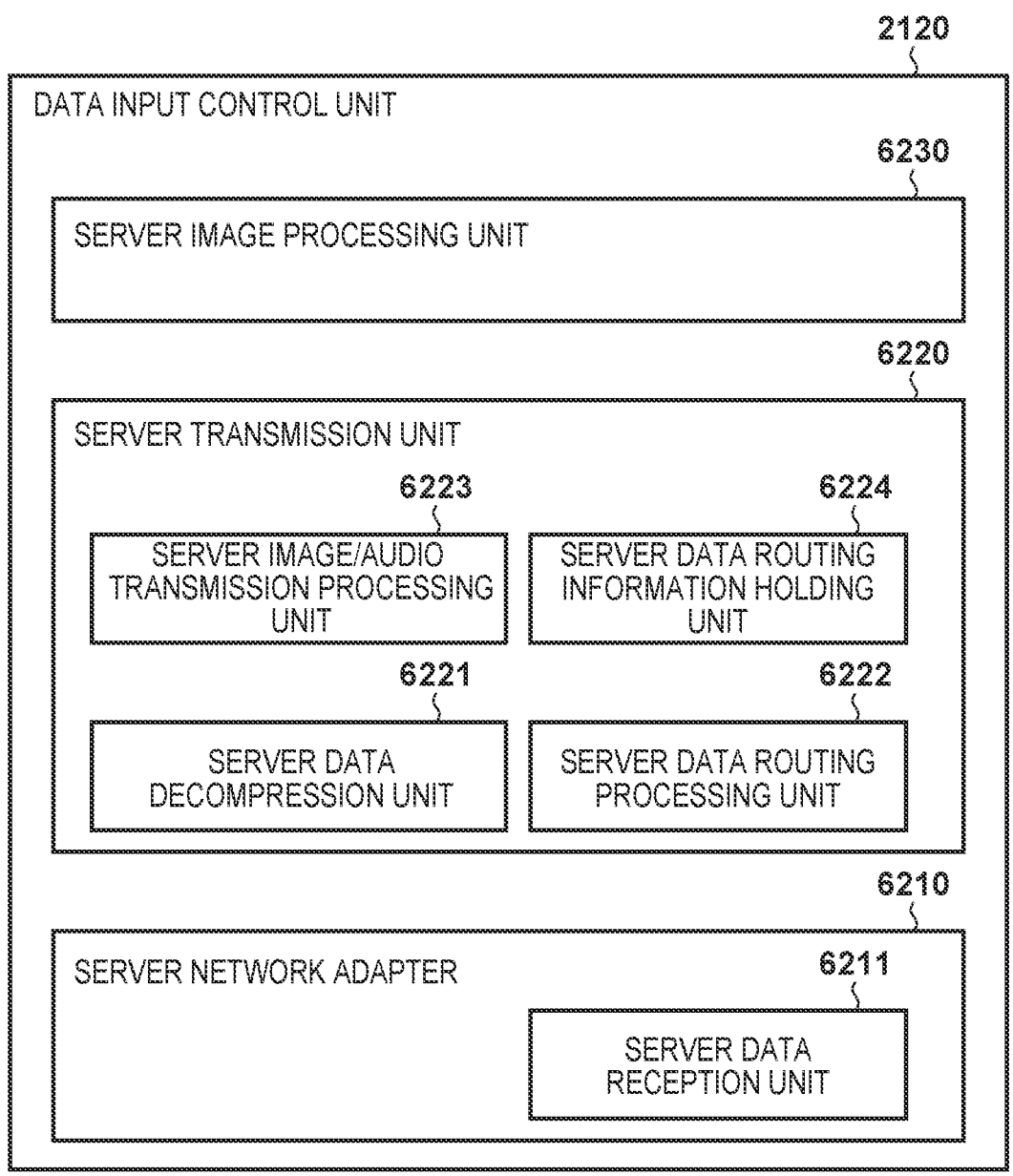
FIG. 5 is a block diagram for explaining the arrangement of a data input control unit of the front end server.

The structure and function of the data input control unit 2120 in the front end server 230 will be described next with reference to a functional block diagram shown in FIG. 5. The data input control unit 2120 includes a server network adapter 6210, a server transmission unit 6220, and a server image processing unit 6230. The server network adapter 6210 includes a server data reception unit 6211 and has a function of receiving data transmitted from the camera adapter 120.

The server transmission unit 6220 has a function of performing a process on the data received from the server data reception unit 6211 and is formed by the following functional units.

A server data decompression unit 6221 has a function of decompressing compressed data. A server data routing processing unit 6222 determines a data transfer destination based on routing information such as an address held by a server data routing information holding unit 6224 (to be described later) and transfers the data received from the server data reception unit 6211. A server image/audio transmission processing unit 6223 receives a message from the camera adapter 120 via the server data reception unit 6211 and in accordance with a data type included in the message, restores fragmented data to image data or audio data. Note that if the restored image data or audio data is compressed, the server data decompression unit 6221 performs decompression processing.

The server data routing information holding unit 6224 has a function of holding address information for determining a transmission destination of the data received by the server data reception unit 6211. Note that a routing method will be described later.

The server image processing unit 6230 has a function of performing a process concerning image data or audio data received from the camera adapter 120. Processing contents of the server image processing unit 6230 include information according to actual data (foreground image, background image and 3D model information) of the image data, for example, a camera number, a shooting time of an image frame, an image size, an image format, shaping processing to a format to which attribute information such as the coordinates of an image is assigned, and the like.

Figure 6:
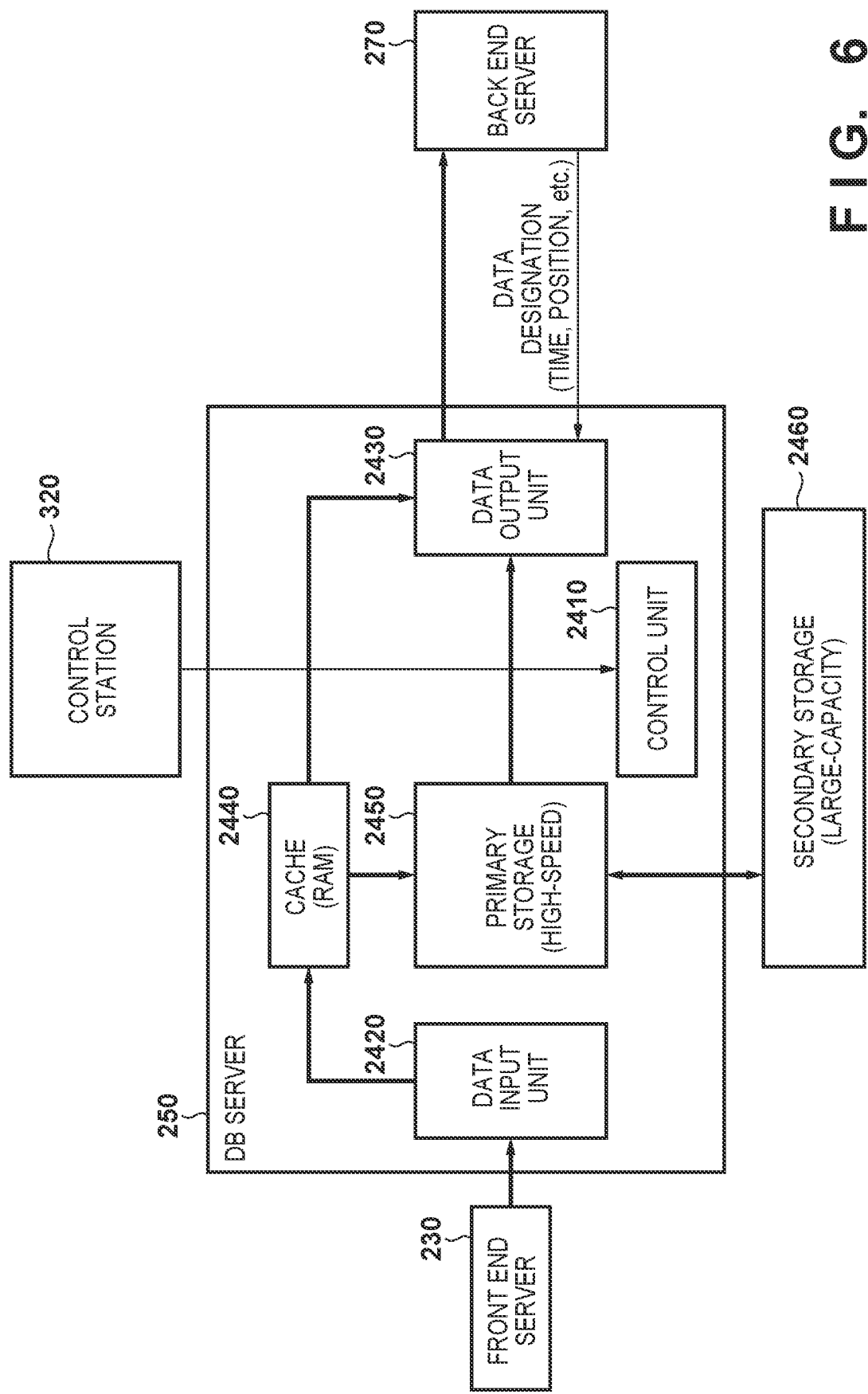
FIG. 6 is a block diagram for explaining the functional arrangement of a database.

The arrangement and function of the database 250 will be described next with reference to a functional block diagram in FIG. 6. A control unit 2410 is formed by hardware, for example, a CPU, a DRAM, a storage medium such as an HDD or a NAND memory that stores program data and various data, and Ethernet®. Then, the control unit 2410 controls the respective functional blocks of the database 250 and the entire system of the database 250.

A data input unit 2420 receives a file of shooting data or non-shooting data from the front end server 230 by high-speed communication such as InfiniBand. The received file is transmitted to a cache 2440. In addition, meta information of the received shooting data is read out, and based on time code information, routing information, and information on a camera identifier or the like recorded in the meta information, a database table is created to be accessible to acquired data.

A data output unit 2430 determines whether data requested from the back end server 270 is stored in one of the cache 2440, a primary storage 2450, and a secondary storage 2460 (to be described later). Then, the data output unit 2430 reads out data from a storage destination and transmits it to the back end server 270 by high-speed communication such as InfiniBand.

The cache 2440 includes a storage device such as a DRAM capable of implementing an input/output throughput at a high speed and stores the shooting data or non-shooting data acquired from the data input unit 2420 in the storage device. The stored data is held by a predetermined amount. If data exceeding the predetermined amount is input, data is sequentially written in the primary storage 2450 beginning with the chronologically oldest data, and the written data is overwritten by new data. Note that the data stored in the cache 2440 by the predetermined amount is shooting data of at least one frame. This makes it possible to suppress a throughput in the database 250 at a minimum and to render the latest image frame continuously with low delay when performing rendering processing on an image in the back end server 270. Note that in order to achieve the above-described purpose, a background image needs to be included in cached data. Therefore, if shooting data of a frame without any background image is cached, a background image on the cache remains held on the cache without updating. The capacity of a DRAM that can be cached is determined by a cache frame size preset in a system or an instruction from the control station 320. Note that non-shooting data is neither input/output frequently nor requested for a high-speed throughput before a game or the like, and thus copied to the primary storage immediately. The data output unit 2430 reads out cached data.

The primary storage 2450 is formed by, for example, connecting storage media such as SSDs in parallel, and writes an enormous amount of data from the data input unit 2420 and reads out data from the data output unit 2430 simultaneously at a high speed. Then, data stored on the cache 2440 is sequentially written in the primary storage 2450 beginning with the chronologically oldest data.

The secondary storage 2460 is formed by an HDD, a tape medium, or the like, emphasizes a large capacity rather than a high speed, and is required to be a medium which is less expensive than the primary storage and suitable for long-term storage. After the completion of shooting, data stored in the primary storage 2450 is written in the secondary storage 2460 as data backup.

Figure 7:
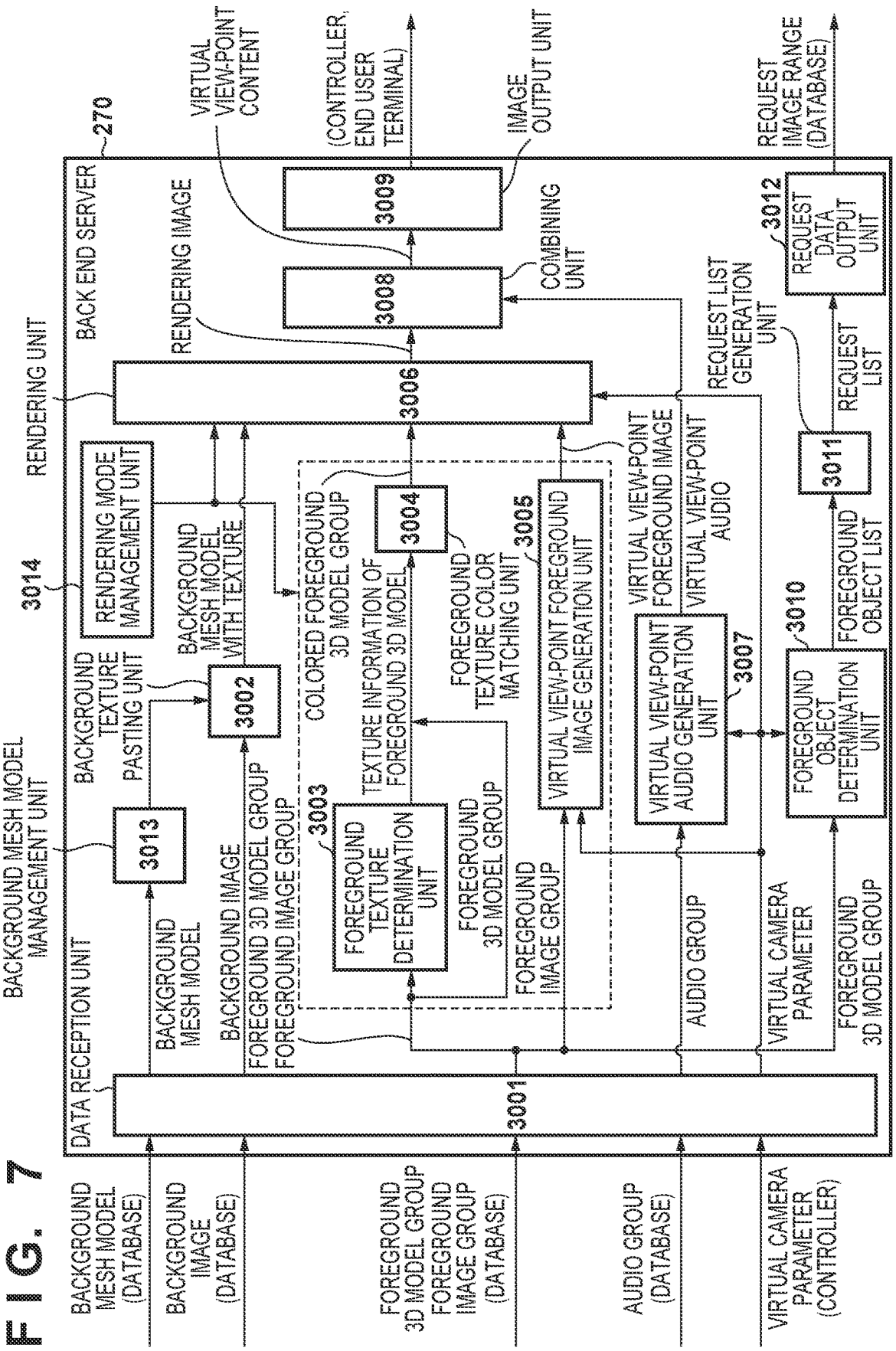
FIG. 7 is a block diagram for explaining the functional arrangement of a back end server.

FIG. 7 shows the arrangement of the back end server 270 according to this embodiment. The back end server 270 includes a data reception unit 3001, a background texture pasting unit 3002, a foreground texture determination unit 3003, a foreground texture boundary color matching unit 3004, a virtual view-point foreground image generation unit 3005, and a rendering unit 3006. The back end server 270 further includes a virtual view-point audio generation unit 3007, a combining unit 3008, an image output unit 3009, a foreground object determination unit 3010, a request list generation unit 3011, a request data output unit 3012, and a rendering mode management unit 3014.

The data reception unit 3001 receives data transmitted from the database 250 and controller 300. The data reception unit 3001 also receives 3D data indicating the shape of a stadium (stadium shape data), 3D model of a foreground image, a background image, and a foreground image (to be referred to as a foreground 3D model hereinafter), and an audio from the database 250.

In addition, the data reception unit 3001 receives a virtual camera parameter output from the controller 300 that designates a view-point concerning generation of a virtual view-point image. The virtual camera parameter is data representing the position, orientation, or the like of the virtual view-point, and uses, for example, the matrix of an external parameter and the matrix of an internal parameter.

Note that the data acquired by the data reception unit 3001 from the controller 300 is not limited to the virtual camera parameter. Information output from the controller 300 may include, for example, at least one of a method of designating a view-point, information for specifying an application operated by the controller, identification information of the controller 300, and identification information of a user using the controller 300. Moreover, the data reception unit 3001 may acquire, from the end user terminal 190, the same information as the above-described information output from the controller 300. Furthermore, the data reception unit 3001 may acquire information concerning the plurality of cameras 112 from an external apparatus such as the database 250 or the controller 300. The information concerning the plurality of cameras 112 is, for example, information concerning the number of plurality of cameras 112, information concerning operation states of the plurality of cameras 112, or the like. The operation state of each camera 112 includes, for example, at least one of a normal state, fault state, standby state, activation state, and reactivation state of the camera 112.

The background texture pasting unit 3002 generates a background mesh model with a texture by pasting, as a texture, a background image to a 3D spatial shape which is indicated by a background mesh model (stadium shape data) acquired from a background mesh model management unit 3013. A mesh model is, for example, data obtained by expressing a 3D spatial shape by a set of planes such as CAD data. A texture is an image which is pasted in order to express a texture on the surface of an object.

The foreground texture determination unit 3003 determines texture information of a foreground 3D model by a foreground image and a foreground 3D model group. The foreground texture boundary color matching unit 3004 performs color matching on the boundary of textures from pieces of texture information of respective foreground 3D models and respective 3D model groups, and generates a colored foreground 3D model group for each foreground object. Based on the virtual camera parameter, the virtual view-point foreground image generation unit 3005 performs perspective transformation on a foreground image group to obtain an appearance from a virtual view-point. Based on a generation method which is determined by the rendering mode management unit 3014 and used to generate a virtual view-point image, the rendering unit 3006 renders a background image and a foreground image to generate a panoramic virtual view-point image.

In this embodiment, as a method of generating a virtual view-point image, two rendering modes, namely, Model-Based Rendering (MBR) and Image-Based Rendering (IBR) are used.

MBR is a method of generating a virtual view-point image by using a 3D model which is generated based on a plurality of images obtained by shooting an object from a plurality of directions. More specifically, MBR is a technique of using a 3D shape (model) of a target scene obtained by a 3D shape restoring method such as a volume intersection method or Multi-View-Stereo (MVS) and generating a sight of a scene from a virtual view-point as an image. IBR is a technique of generating a virtual view-point image that reproduces a sight from a virtual view-point by modifying and combining input image groups obtained by shooting a target scene from a plurality of view-points. In this embodiment, if IBR is used, a virtual view-point image is generated based on one or a plurality of shot images which are smaller in number than a plurality of shot images for generating a 3D model by using MBR.

If the rendering mode is MBR, a panoramic model is generated by combining a background mesh model and the foreground 3D model group generated by the foreground texture boundary color matching unit 3004, and a virtual view-point image is generated from the panoramic model.

If the rendering mode is IBR, a background image viewed from a virtual view-point is generated based on a background texture model, and a virtual view-point image is generated by combining the foreground image generated by the virtual view-point foreground image generation unit 3005 with the generated background image.

Note that the rendering unit 3006 may use a rendering method other than MBR and IBR. In addition, a method of generating a virtual view-point image determined by the rendering mode management unit 3014 is not limited to a rendering method, and the rendering mode management unit 3014 may determine a processing method other than rendering for generating a virtual view-point image. The rendering mode management unit 3014 determines a rendering mode serving as a generation method used to generate a virtual view-point image and holds a determination result.

In this embodiment, the rendering mode management unit 3014 determines a rendering mode to be used from a plurality of rendering modes. This determination is made based on information acquired by the data reception unit 3001. For example, if the number of cameras specified from the acquired information is equal to or less than a threshold, the rendering mode management unit 3014 determines the generation method used to generate a virtual view-point image to IBR. On the other hand, if the number of cameras is larger than the threshold, the rendering mode management unit 3014 determines the generation method to MBR. Consequently, a range capable of designating a view-point is widened by generating a virtual view-point image using MBR if the number of cameras is large. If the number of cameras is small, it is possible, by using IBR, to avoid degradation in quality of a virtual view-point image caused by a decrease in precision of a 3D model when MBR is used. Alternatively, the generation method may be determined based on, for example, the length of a permissible processing delay time from shooting to an image output. MBR is used when the degree of freedom of a view-point has priority even if a delay time is long. IBR is used when a short delay time is requested. In addition, for example, when the data reception unit 3001 acquires information indicating that the controller 300 or the end user terminal 190 can designate the height of a view-point, the generation method used to generate a virtual view-point image is determined to MBR. This makes it possible to prevent a request to change the height of a view-point by the user from becoming unacceptable because IBR is used as the generation method. By thus determining the method of generating a virtual view-point image in accordance with a situation, it is possible to generate a virtual-view point image by a generation method determined appropriately. It is specified that the system can be formed flexibly by adopting an arrangement capable of switching the plurality of rendering modes in accordance with a request, and this embodiment can also be applied to an object other than a stadium.

Note that a rendering mode held by the rendering mode management unit 3014 may be a method preset in the system. A user operating the virtual camera operation UI 330 or the end user terminal 190 may be able to set the rendering mode arbitrarily.

Based on the virtual camera parameter, the virtual view-point audio generation unit 3007 generates an audio (audio group) heard at a virtual view-point. The combining unit 3008 generates virtual view-point content by combining an image group generated by the rendering unit 3006 and an audio generated by the virtual view-point audio generation unit 3007.

The image output unit 3009 outputs the virtual view-point content to the controller 300 and the end user terminal 190 by using Ethernet®. However, a transmission unit to an outside is not limited to Ethernet®, and a signal transmission unit such as SDI, DisplayPort, or HDMI® may be used. Note that the back end server 270 may output a virtual view-point image without any audio, which is generated by the rendering unit 3006.

The foreground object determination unit 3010 determines a foreground object group to be displayed from the virtual camera parameter and positional information of a foreground object that indicates the position on a space of a foreground object included in a foreground 3D model, and outputs the foreground object group to a foreground object list. That is, the foreground object determination unit 3010 executes a process of mapping image information of a virtual view-point to the physical camera 112. This virtual view-point has different mapping results in accordance with the rendering mode determined by the rendering mode management unit 3014. It is therefore specified that a plurality of control units each determining a foreground object are provided in the foreground object determination unit 3010, and perform control in synchronism with the rendering mode.

The request list generation unit 3011 generates a request list for requesting, from the database 250, a foreground image group and foreground 3D model group corresponding to a foreground object list of a designated time, and a background image and audio data. For a foreground object, data selected in consideration of a virtual view-point is requested from the database 250. For the background image and the audio data, however, all data concerning the frame are requested. After activation of the back end server 270, a request list of a background mesh model is generated until the background mesh model is acquired.

The request data output unit 3012 outputs a data request command to the database 250 based on an input request list. The background mesh model management unit 3013 stores the background mesh model received from the database 250.

Note that in this embodiment, a case in which the back end server 270 performs both the determination of the method of generating a virtual view-point image and generation of a virtual view-point image will mainly be described. However, the present invention is not limited to this. That is, an apparatus that has determined the generation method can output data according to the determination result. For example, based on information concerning the plurality of cameras 112, information output from an apparatus that designates a view-point related to generation of the virtual view-point image, or the like, the front end server 230 may determine the generation method used to generate the virtual view-point image. Then, the front end server 230 may output image data based on shooting by the camera 112 and information indicating the determined generation method to at least one of the storage device such as the database 250 and the image generating apparatus such as the back end server 270. In this case, for example, based on information that indicates the generation method output by the front end server 230, the back end server 270 generates a virtual view-point image. The front end server 230 determines the generation method, making it possible to reduce a processing load caused by causing the database 250 or the back end server 270 to process data for image generation in a method different from the determined method. On the other hand, if the back end server 270 determines the generation method as in this embodiment, the database 250 holds data capable of supporting a plurality of generation methods, making it possible to generate a plurality of virtual view-point images corresponding to the plurality of generation methods, respectively.

By adopting the above-described system arrangement, it becomes possible to generate a desired virtual view-point image from shot images acquired by the plurality of cameras.

Figure 11A:
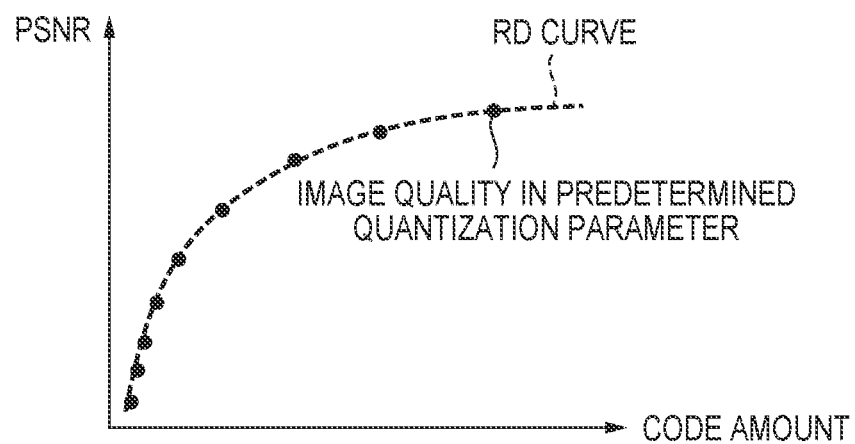
FIGS. 11A to 11C are graphs each for explaining a relationship among a code amount, an image quality, and a quantization parameter according to the first embodiment.

A code amount control processing of the camera adapter 120 will be described next. The purpose of this processing is to determine an encoding method at an individual view-point appropriately so as to obtain a code amount based on a transmission path in the system. FIG. 11A shows a relationship between an image quality and a code amount in changing a quantization parameter and encoding it by a predetermined encoding method when the ordinate represents the image quality, and the abscissa represents the code amount, and is also called an RD curve in general. In this embodiment, this RD curve is acquired in advance by, for example, creating it by encoding as a backup under the same environment before actual encoding. Then, a target code amount is implemented by determining a target image quality of a camera adapter of interest and applying a quantization parameter capable of satisfying the target image quality with reference to the RD curve. Note that the quantization parameter determines a quantization step of a pixel value or coefficient value in a quantization process before performing encoding.

In the embodiment, the camera adapter 120 in the sensor system 110 performs a process of determining the quantization parameter.

Before a description below, a difference between a line-of-sight direction of a camera in the sensor system 110 of interest connected by a daisy chain and a line-of-sight direction of a camera in a one-upstream sensor system falls within a preset range. However, one upstream of the most upstream sensor system 110 is the most downstream sensor system 110, and a difference in line-of-sight direction between them also falls within the preset range.

Then, the total number of camera adapters will be referred to as Vnum, and a code amount of encoded data when the vth (one of v=1, 2, . . . , Vnum) camera adapter from the most upstream (camera adapter of interest) encodes a captured image at a timing t will be referred to as $C[t, v]$. Further, a target image quality of the camera adapter of interest will be referred to as $Q[t, v]$. Furthermore, let Bt be a basic code amount of image data generated by each camera adapter. This basic code amount Bt is a value set in each individual camera adapter in order to transmit entire data acquired in this system in real time through a transmission path of a predetermined band. In this embodiment, this basic code amount Bt is a value obtained by dividing a band to be used to transmit a video in a communication band of the transmission path by the number of view-points (the number of cameras).

Furthermore, the respective camera adapters communicate with each other, and share code amounts of encoded image data and target image qualities. They share code amounts $C[t, *]$ and $C[t-1, *]$, and target image qualities $Q[t, *]$ and $Q[t-1, *]$ at the current timing t and a past timing. Code amounts and target image qualities older than these are discarded in order to prevent an increase in memory consumption.

Figure 9:
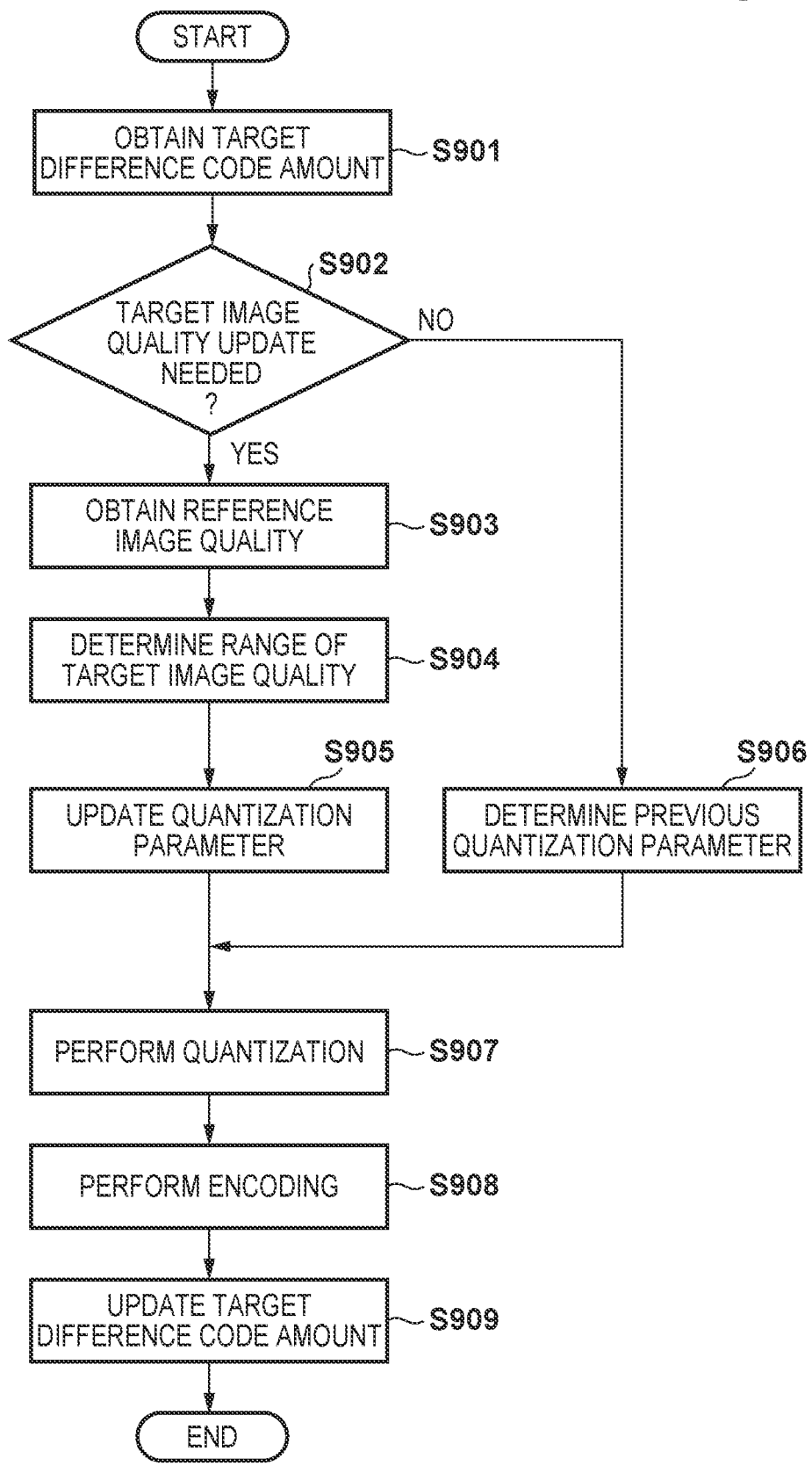
FIG. 9 is a flowchart for explaining code amount control processing according to the first embodiment.

The vth camera adapter (one of reference numerals 120a to 120z in FIG. 1) is set to a camera adapter of interest (image capturing device of interest), and code amount control processing of the camera adapter of interest will be described below with reference to a flowchart in FIG. 9. Note that a target code amount to be described below means a target code amount when encoding an image captured at this timing (timing t). Therefore, it should be noted not to confuse this target code amount and the above-described basic code amount.

First, in step S901, the camera adapter of interest acquires, from a camera adapter located at the immediately upstream position, a target difference code amount Dc representing a difference between a target code amount and a code amount of encoded data which is generated by a camera adapter of the immediately upstream position from the most upstream camera adapter (the (v−1)th camera adapter). Note that the target difference code amount Dc has the following meaning.

Defining the most upstream camera adapter as the first camera adapter, the total amount of encoded data generated from the first to (v−1)th camera adapters is defined as Ctotal[t, v−1].

$$Ctotal[t,v-1]=\Sigma C[t,i]$$

(where Σ represents addition of i=1, 2, . . . , v−1.)

The total of the basic code amounts Bt of the v−1 camera adapters is (v−1) times Bt, and thus the target difference code amount Dc is given by:

$$Dc=(v-1)\cdot Bt-Ctotal[t,v-1]$$

In step S902, based on the target difference code amount Dc obtained in step S303 above, the camera adapter of interest determines whether to update the target image quality $Q[t, v]$ when actually encoding an image captured by a camera of the camera adapter of interest. More specifically, letting 1d be a preset threshold, the camera adapter of interest determines whether the following condition is satisfied.

condition: |Dc|>1d

Then, the camera adapter of interest determines that an update is needed if this condition is satisfied. The camera adapter of interest advances the process to step S903 if it determines that the update is needed, and advances the process to step S906 if it determines that the update is not needed.

Figure 10:
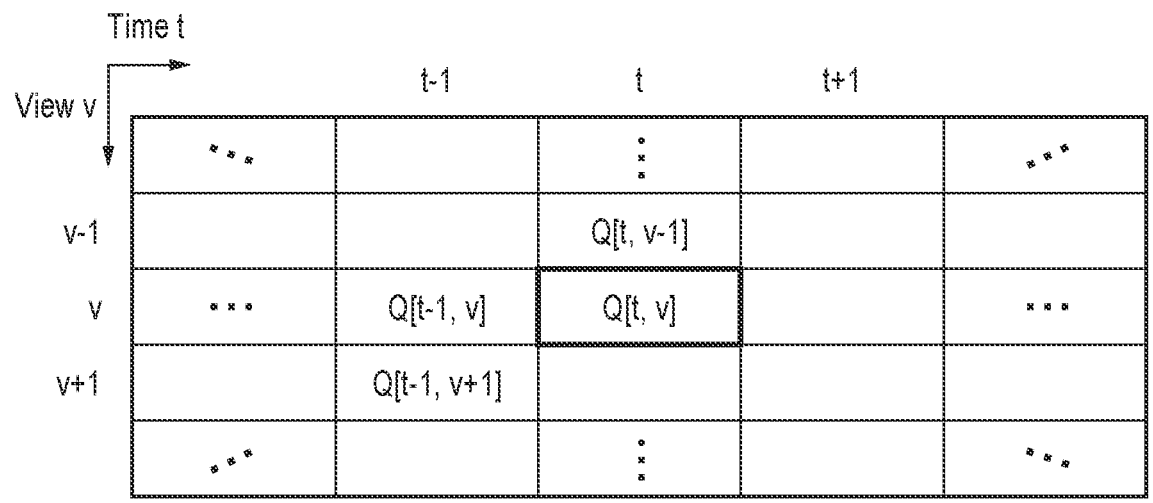
FIG. 10 is a table for explaining a reference camera adapter according to the first embodiment.

In step S903, the camera adapter of interest acquires a reference image quality for determining the target image quality $Q[t, v]$ of an image captured by the camera 112 connected to itself (to be referred to as an encoding target image hereinafter). In this process, the camera adapter of interest acquires target image qualities at adjacent encoded view-points on a time axis and a view-point axis. In this embodiment, as shown in FIG. 10, the camera adapter of interest acquires target image qualities $Q[t-1, v]$, $Q[t, v-1]$, and $Q[t-1, v+1]$ which are temporally and spatially adjacent to $Q[t, v]$. However, the number of reference camera adapters is not limited to this, and continuity of image qualities may be improved with reference to camera adapters more broadly. If it is difficult to use the target image quality $Q[t, v-1]$ at the current timing t in terms of a processing speed, only a target image quality at a past timing (before t−1) is used. Note that an objective index value such as a PSNR or an SSIM is used for each target image quality.

Next, in step S904, the camera adapter of interest determines the range of the target image quality $Q[t, v]$ with respect to the encoding target image. In this process, the reference image qualities $Q[t-1, v]$, $Q[t, v-1]$, and $Q[t-1, v+1]$ acquired in step S903 above are used, and the camera adapter of interest performs control so as not to make a large change from these values. As a method of determining a target image quality, for example, a positive permissible image quality difference qd between view-points can be determined in advance and can be a range (permissible range) that satisfies all the following conditions.

$$Q[t-1,v]-qd<Q[t,v]<Q[t-1,v]+qd$$

$$Q[t,v]-qd<Q[t,v]<Q[t,v]+qd$$

$$Q[t-1,v+1]-qd<Q[t,v]<Q[t-1,v+1]+qd$$

Figure 11B:
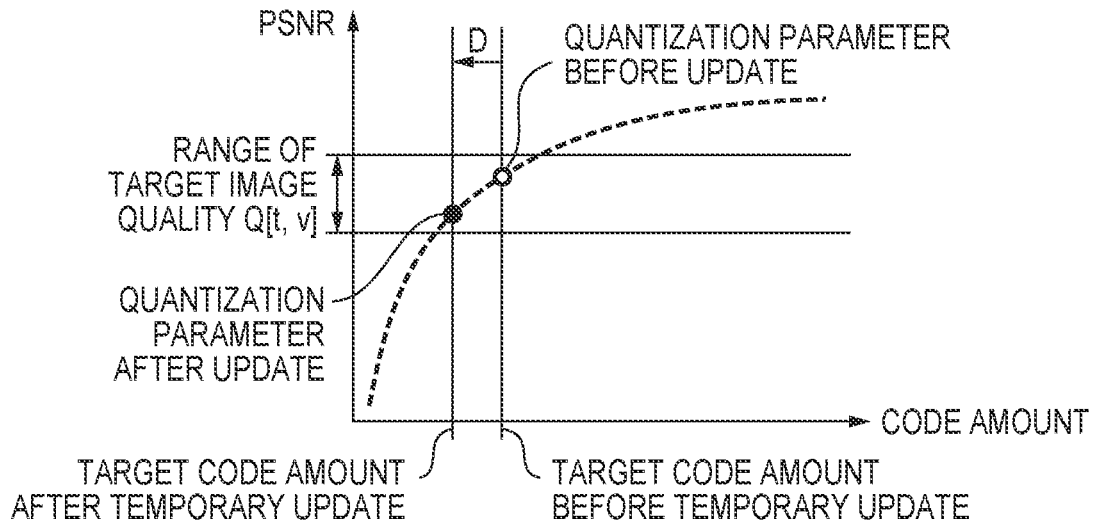
Figure 11C:
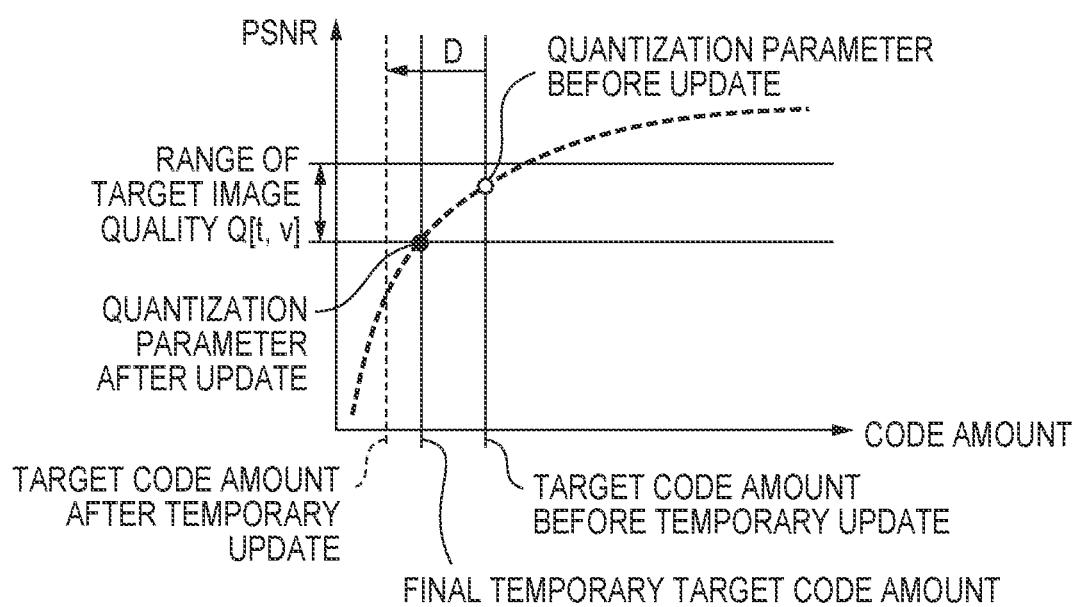

With this process, as shown in FIGS. 11B and 11C, the range of the target image quality $Q[t, v]$ is determined.

Next, in step S905, the camera adapter of interest determines a quantization parameter of the encoding target image in the camera adapter of interest based on the range of the target image quality Q[t, v] set in the previous step, the target difference code amount Dc, and the basic code amount Bt.

More specifically, as shown in FIG. 11B, a value obtained by adding the target difference code amount Dc to the previous (timing t−1) target code amount in the camera adapter of interest is set to a target code amount after an update. Then, based on the RD curve, a quantization parameter capable of implementing the target code amount after the update is determined as a quantization parameter to be encoded in the camera adapter of interest. At this time, according to the embodiment, if an image quality corresponding to a value obtained by adding the target difference code amount Dc to a target code amount before the update falls within the permissible range of the target image quality as shown in FIG. 11C, the image quality is set to the target image quality. Then, if the image quality falls outside the permissible range, a boundary value (an upper limit value or a lower limit value representing a range) in the permissible range of the target image quality close to the value becomes a target image quality after the update.

On the other hand, if the camera adapter of interest determines that the target image quality need not be updated and advances the process to step S906, it determines that the encoding target image is to be encoded by using the same quantization parameter as before (timing t−1).

In step S907, based on the quantization parameter determined in step S905 or S906, the camera adapter of interest performs quantization (quantization after frequency conversion in some cases) of the encoding target image. Then, in step S908, the camera adapter of interest performs encoding. The code amount of encoded data obtained by this encoding will be C[t, v].

Then, in step S909, the camera adapter of interest updates the target difference code amount Dc in accordance with the following equation and notifies a downstream camera adapter of this.

$$Dc = v \cdot Bt - \{Ctotal[t,v-1] + C[t,v]\} = vBt - Ctotal[t,v]$$

With the above process, since the code amount can be controlled in consideration of the image qualities of the adjacent camera adapters on the time axis and the view-point axis, it is possible to transmit a video in real time without causing a large image quality difference in video used when generating a free-view-point video.

Note that in the above-described embodiment, the description has been made assuming that the respective camera adapters share the target image qualities and the encoded data amounts. However, when the respective cameras transmit encoded image data to the image computing server 200, they may transmit these pieces of information as attached information. That is, the image computing server 200 may determine encoding parameters of the respective camera adapters.

Second Embodiment

In the first embodiment, when controlling a code amount, an update is performed with reference to the image qualities of the adjacent camera adapters on the time axis and the view-point axis for the respective camera adapters. According to this method, however, if there is a difference between a target code amount and an actual code amount as a result of processing for all view-points at predetermined time, this tends to influence a target image quality on an upstream side at next time greatly. In this embodiment, in order to solve this problem, a target image quality (to be referred to as a target image quality table hereinafter) at each view-point is determined in two steps. A detailed example will be described with reference to FIGS. 14A to 14C. Note that it should be understood that the following description will be given by processing for a camera adapter of interest.

First, when processing for all view-points at time t−1 is ended, the target image quality table is in a state of FIG. 14A. Then, the target image quality table at the time t−1 is updated with reference to a target difference code amount and set to a target image quality table at time t. For example, if a target image quality change amount is −1.0, the target image quality table is set in a state as in FIG. 14B. This will be referred to as the first target image quality update. This target image quality table is transmitted to each camera adapter and set as an initial image quality of each camera. Next, each camera adapter at the time t further updates the target image quality table based on a target difference code amount Dc generated up to an upstream camera adapter of a self-camera adapter. For example, if a target image quality change amount in the camera adapter of interest is −0.2, the target image quality table is set in a state as in FIG. 14C. This updating processing will be referred to as the second target image quality update. Then, using the target image quality of a self-camera in the target image quality table that has undergone this second target image quality update, a quantization parameter is determined to perform encoding. In the second embodiment, letting D[t−1] be a target difference code amount of all cameras at the time t−1, and Vnum be the total number of view-points, a target code amount X[t, v] of the camera adapter at a view-point v is a value calculated by:

$$X[t,v] = X[t-1,v] - D[t-1]/\text{Vnum}$$

The value calculated based on the above equation is set to a target code amount table and transmitted to each camera adapter together with the target image quality table.

Figure 12:
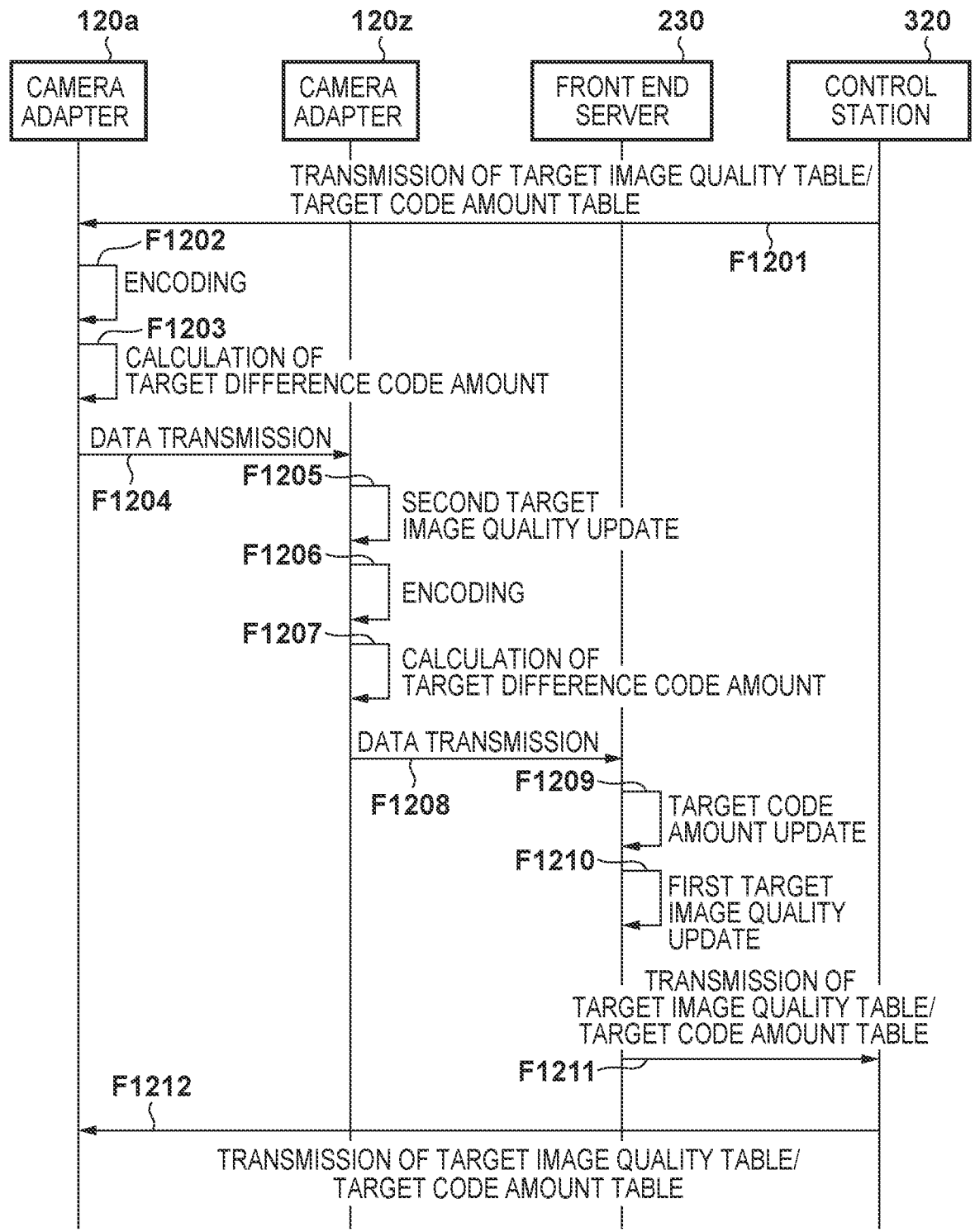
FIG. 12 is a sequence chart showing code amount control according to the second embodiment.

The sequence of a process in this embodiment will be described with reference to a sequence chart in FIG. 12. Note that FIG. 12 shows only a most upstream camera adapter 120a and a most downstream camera adapter 120z for the sake of descriptive simplicity. Moreover, only a process concerning code amount control will be described.

First, a control station 320 transmits the target image quality table and the target code amount table to the most upstream camera adapter 120a (F1201). As described above, this target image quality table has undergone the first target image quality update at the previous time.

Next, the camera adapter 120a encodes an image shot by a camera corresponding to itself (F1202). The second target image quality update is performed originally before this process. However, since the camera adapter 120a is the most upstream camera adapter, a value of the target image quality table is used directly. After a quantization parameter is determined from the target image quality, encoding is performed on a pixel value quantized based on the quantization parameter as in steps S907 and S908 of the first embodiment.

Next, the camera adapter 120a calculates the target difference code amount Dc as the difference between the target code amount and the actual code amount (F1203).

Next, the camera adapter 120a transmits, to the camera adapter 120z, a result of encoding an image, the target difference code amount Dc, the target image quality table, and the target code amount table (F1204).

Next, the camera adapter 120z performs the second target image quality update based on data received from the camera adapter 120a (F1205). In this process, a target image quality of a camera adapter at a view-point adjacent to the immediately upstream position at the same time is acquired as a reference. Upon acquiring the reference target image quality, the range of the target image quality and the quantization parameter are determined as in steps S904 and S905 of the first embodiment. At this time, a range to be updated is restricted to be a threshold qd or less predetermined together with a change amount to be updated in the first target image quality update.

Next, the camera adapter 120z encodes an image shot by a camera corresponding to itself (F1206). This process can be the same as in F1202.

Next, the camera adapter 120z calculates the target difference code amount as the difference between the target code amount and the actual code amount, and integrates it with a value received from the upstream (F1207).

Next, the camera adapter 120z transmits, to a front end server 230, the result of encoding the image, the target difference code amount, the target image quality table, and the target code amount table (F1208).

Next, the front end server 230 determines a target code amount at next time based on the target difference code amount at the current time received form the camera adapter 120z (F1209). This process aims at compensating for the target difference code amount generated at the current time with all view-points at the next time. A method of calculating the target code amount is as described above.

Next, the front end server 230 performs the first target image quality update based on the target code amount table obtained in the previous process (F1210). In this process, an image quality corresponding to the target code amount at the next time obtained in the previous process by using an RD curve is set to a target image quality at the next time. At this time, however, if a change amount between the obtained target image quality and the target image quality at the current time is not equal to or less than the predetermined threshold qd, it is rounded and restricted by the change amount qd.

Next, the front end server 230 transmits the target image quality table and target code amount table obtained in the previous process to the control station 320 (F1211).

Next, the control station 320 transmits the target image quality table and the target code amount table to the camera adapter 120a (F1212).

With the above processing arrangement, since the front end server 230 can update the target image qualities at all the view-points at once, it is possible to control a code amount without concentrating compensation for the target difference code amount at the previous time on a view-point on an upstream side in a processing time.

The target difference code amount Dc received by the camera adapter 120z located in the most downstream from a one-upstream camera adapter is ultimately a difference between all code amounts at the timing t by all camera adapters and a basic code amount Bt×the number of cameras. Hence, the camera adapter 120z located in the most downstream may perform the process by the front end server 230 described above.

Third Embodiment

In the first and second embodiments, all the basic code amounts used when determining the target image qualities in the respective camera adapters have the same value. However, videos acquired at respective view-points are different in complexity, and thus generated code amounts are different even if the same image quality parameter is set. If basic code amounts are set to have the same value in this case, image qualities may be different greatly between a view-point with high complexity and a view-point with low complexity. In particular, in a case in which an important region such as a foreground is to be kept with a high image quality, an area occupied by a foreground region for each view-point is different, making this problem conspicuous. In this embodiment, a system that performs lossless encoding on a foreground region and lossy encoding accompanying quantization on a background region, and a method of controlling, in accordance with the area of the foreground region, a code amount while setting a target code amount of the background region (to be referred to as a background target code amount table) at each view-point will be described.

FIG. 13 is a sequence chart at the time of code amount control according to the third embodiment.

First, a control station 320 transmits a background target image quality table and a background target code amount table to a most upstream camera adapter 120a (F1301). This background target image quality table has undergone the first target image quality update at a previous time (timing t−1). In addition, the background target code amount table has been determined by a front end server 230 at the previous time. A determination method in the front end server 230 will be described later.

Next, the most upstream camera adapter 120a performs foreground/background separation on an acquired image (F1302). This process is the same as the process performed by the foreground/background separation unit 6131 described in the first embodiment.

Next, the camera adapter 120a encodes the acquired image (F1303). First, lossless encoding is performed on the foreground region here. Then, after a quantization parameter is determined from the background target image quality, encoding is performed on a pixel value quantized based on the quantization parameter as in steps S907 and S908 of the first embodiment with respect to the background region.

Next, the camera adapter 120a calculates a value Dc representing a target difference code amount as a difference between a target code amount and an actual code amount (F1304). Next, the camera adapter 120a transmits, to a camera adapter 120z, a result of encoding an image, the number of foreground pixels, the target difference code amount, the background target image quality table, and the background target code amount table (F1305).

The camera adapter 120z performs foreground/background separation on the acquired image (F1306). This process can be the same as in F1302. Next, the camera adapter 120z performs the second background target image quality update based on data received from the camera adapter 120a (F1307). This process can be the same as in F1205 of the second embodiment with respect to the background region.

Next, the camera adapter 120z encodes the acquired image (F1308). This process can be the same as in F1303. Next, the camera adapter 120z calculates the target difference code amount as the difference between the target code amount and the actual code amount, and integrates it with a value received from the upstream (F1309).

Next, the camera adapter 120z transmits, to the front end server 230, the result of encoding the image, the number of foreground pixels, the target difference code amount, the background target image quality table, and the background target code amount table (F1310).

Next, the front end server 230 integrates the number of foreground pixels at all view-points received from the camera adapter 120z and obtains the total number of foreground pixels (F1311).

Next, the front end server 230 determines target code amounts at all view-points at next time based on the total number of foreground pixels, a target difference code amount at a current time received from the camera adapter 120z, and the number of foreground pixels at respective view-points (F1312). In this embodiment, a target code amount X[t, v] of the camera adapter at a view-point v is a value calculated by an equation below. Note that let D[t−1] be a target difference code amount at the time t−1, P[t−1, v] be the number of foreground pixels at the time t−1, and Ptotal be the total number of foreground pixels.

Next, the front end server 230 performs the first background target image quality update based on the background target code amount table obtained in the previous process (F1313). In this process, an image quality corresponding to the target code amount at the next time obtained in the previous process by using an RD curve is set to a background image quality. This process can be the same as in F1210 of the second embodiment with respect to the background region. Next, the front end server 230 transmits the background target image quality table and background target code amount table obtained in the previous process to the control station 320 (F1314). Next, the control station 320 transmits the background target image quality table and the background target code amount table to the camera adapter 120a (F1315).

With the above-described process, since a target code amount can be allocated in accordance with the area of the foreground region for each view-point, it is possible to keep an image quality difference between the view-points smaller. Note that in this embodiment, the distribution of the target code amount is determined by using only the percentage of the foreground area. However, the distribution can be performed more accurately by using the complexity of the background region as well which is, for example, acquired in advance. Additionally, in this embodiment, lossless encoding is performed on the foreground region. However, lossy encoding may be performed if a code amount increases. In this case, the target image quality of the foreground region and the target image quality of the background region are controlled separately.

Fourth Embodiment

In the first embodiment, reference is made to the target image quality at the previous time when determining the target image quality in order to reduce the image quality difference between the times. Additionally, in the second embodiment, the target image quality at the next time is updated while restricting it to be the change amount equal to or less than the threshold with reference to the target difference code amount at the current time.

Other than this, when image quality continuity on a view-point axis is emphasized more, target image qualities at all the view-points at the next time can have a uniform value in the first target image quality update processing of a front end server 230. To do this, first, the front end server 230 calculates an average value of the target image qualities at all the view-points at the current time and sets it to a target image quality base. Then, this target image quality base is changed so as to achieve the target code amount. At this time, the change amount of the target image quality base is controlled to be equal to or less than a threshold. Then, the obtained target image quality base is set as the target image qualities at all the view-points.

With the above process, it is possible to perform code amount control with higher image quality continuity on the view-point axis.

Fifth Embodiment

The aforementioned embodiments implement achievement of the target image qualities and target code amounts by controlling the quantization parameters in quantization. This makes it possible to implement a code amount close to a target code amount in each camera adapter. For such an arrangement, however, since an actual code amount is known only after encoding, a target code amount cannot always be achieved. Therefore, in this embodiment, a method of controlling a code amount with reference to the actual code amount will be described.

First, a target image quality is determined as in the aforementioned embodiments. Next, as in JPEG2000, frequency conversion is performed on an image, and encoding is performed for each bit plane arranged at the same bit position of a value representing an obtained conversion coefficient. Then, with reference to a code amount after encoding, a truncation position of a bit plane capable of achieving a target code amount is determined, and a bit plane lower than the truncation position is truncated. At this time, however, a truncation point is controlled such that a change amount between an image quality when the bit plane is truncated, and image qualities of adjacent camera adapters on a time axis and a view-point axis is equal to or less than a threshold. More specifically, if an image quality which is truncated by the truncation point determined by the target code amount is different by the threshold or more from the image quality of a reference camera adapter, the truncation point is moved to be equal to or less than the threshold.

With the above process, it is possible to control the code amount with reference to the actual code amount.

Sixth Embodiment

In the first embodiment, image quality evaluation values (such as the PSNRs) of the adjacent camera adapters on the view-point axis and the time axis are used in order to determine the quantization parameter in the camera adapter of interest. In addition to this, control may be performed such that a difference between quantization parameters in adjacent camera adapters on a view-point axis and a time axis becomes equal to or less than a threshold with reference to the quantization parameters themselves.

This makes it possible to control a code amount more easily without causing a large image quality difference between the view-point axis and the time axis.

Seventh Embodiment

In the first embodiment, a permissible image quality difference between the adjacent camera adapters on the view-point axis and the time axis is defined by a predetermined fixed value. This is advantageous in a case in which a sufficient buffer capable of holding a target difference code amount during a shooting time exists in a camera adapter. If this is not the case, however, the target difference code amount may overflow from the buffer. In order to prevent this, control is preferably performed so as to dynamically change the permissible image quality difference in accordance with a remaining buffer amount.

In the aforementioned embodiments, a case in which the camera adapters are connected like beads by one transmission path has been described as an example. However, the present invention is not limited to this and is also applicable to another topology. The same problem as in a daisy chain also arises in, for example, a bus topology, and it is therefore preferable that the code amount is controlled while acquiring information on adjacent camera adapters in the same manner. Moreover, in the case of a star topology, although the adjacent camera adapters are not connected directly, necessary information such as image qualities of the adjacent camera adapters can be acquired from a front end server.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-172424, filed Sep. 7, 2017, which is hereby incorporated by reference herein in its entirety.

What is claimed is:

1. An image processing apparatus that operates in a system for generating a virtual view-point image based on a plurality of images acquired by a plurality of image capturing devices that capture an image capturing area from different directions, the image processing apparatus comprising:
one or more memories that store a set of instructions; and
one or more processors that execute the instructions to:
receive first image data based on image capturing at a first timing by a first image capturing device which is one of the plurality of image capturing devices;
obtain evaluation information for evaluating an image quality of encoded second image data, the second image data being image data based on image capturing at a second timing previous to the first timing by the first image capturing device;
obtain evaluation information for evaluating an image quality of encoded third image data, the third image data being image data based on image capturing at the first timing by a second image capturing device which is different from the first image capturing device and is one of the plurality of image capturing devices;
determine, based on at least the obtained evaluation information of the encoded second image data and the obtained evaluation information of the encoded third image data, an encoding parameter for encoding the first image data so that an image quality difference between the encoded first image data and the encoded second image data falls within a predetermined range and an image quality difference between the encoded first image data and the encoded third image data falls within a predetermined range; and
encode the first image data according to the determined encoding parameter.

2. A method of controlling an image processing apparatus that operates in a system for generating a virtual view-point image based on a plurality of images acquired by a plurality of image capturing devices that capture an image capturing area from different directions, the method comprising:
receiving first image data based on image capturing at a first timing by a first image capturing device which is one of the plurality of image capturing devices;
obtaining evaluation information for evaluating an image quality of encoded second image data, the second image data being image data based on image capturing at a second timing previous to the first timing by the first image capturing device;
obtaining evaluation information for evaluating an image quality of encoded third image data, the third image data being image data based on image capturing at the first timing by a second image capturing device which is different from the first image capturing device and is one of the plurality of image capturing devices;
determining, based on at least the obtained evaluation information of the encoded second image data and the obtained evaluation information of the encoded third image data, an encoding parameter for encoding the first image data so that an image quality difference between the encoded first image data and the encoded second image data falls within a predetermined range and an image quality difference between the encoded first image data and the encoded third image data falls within a predetermined range; and
encoding the first image data according to the determined encoding parameter.

3. A non-transitory computer-readable storage medium storing a program which, when read and executed by a computer, causes the computer to perform the steps of a method of controlling an image processing apparatus that operates in a system for generating a virtual view-point image based on shot images acquired by a plurality of image capturing devices, the method comprising:
receiving first image data based on image capturing at a first timing by a first image capturing device which is one of the plurality of image capturing devices;
obtaining evaluation information for evaluating an image quality of encoded second image data, the second image data being image data based on image capturing at a second timing previous to the first timing by the first image capturing device;

obtaining evaluation information for evaluating an image quality of encoded third image data, the third image data being image data based on image capturing at the first timing by a second image capturing device which is different from the first image capturing device and is one of the plurality of image capturing devices;

determining, based on at least the obtained evaluation information of the encoded second image data and the obtained evaluation information of the encoded third image data, an encoding parameter for encoding the first image data so that an image quality difference between the encoded first image data and the encoded second image data falls within a predetermined range and an image quality difference between the encoded first image data and the encoded third image data falls within a predetermined range; and encoding the first image data according to the determined encoding parameter.

4. An image processing system comprising an information processing apparatus which generates a virtual view-point image at a virtual view-point position based on a plurality of images acquired by a plurality of image capturing devices at different view-point positions, and the plurality of image capturing devices each of which includes an image capturing unit, encodes a captured image, and transmits the encoded image to the information processing apparatus, wherein the information processing apparatus comprises:

one or more memories that store a set of instructions; and one or more processors that execute the instructions to:

receive first image data based on image capturing at a first timing by a first image capturing device which is one of the plurality of image capturing devices;

obtain evaluation information for evaluating an image quality of encoded second image data, the second image data being image data based on image capturing at a second timing previous to the first timing by the first image capturing device;

obtain evaluation information for evaluating an image quality of encoded third image data, the third image data being image data based on image capturing at the first timing by a second image capturing device which is different from the first image capturing device and is one of the plurality of image capturing devices;

determine, based on at least the obtained evaluation information of the encoded second image data and the obtained evaluation information of the encoded third image data, an encoding parameter for encoding the first image data so that an image quality difference between the encoded first image data and the encoded second image data falls within a predetermined range and an image quality difference between the encoded first image data and the encoded third image data falls within a predetermined range;

encode the first image data according to the determined encoding parameter.

5. The image processing apparatus according to claim 1, wherein the one or more processors execute the instructions to:

determine, based on a total code amount of image data having been encoded among image data which had been captured at the first timing by the plurality of image capturing devices, a target code amount when the first image data is encoded; and determine, based on the determined target code amount, the encoding parameter.

6. The image processing apparatus according to claim 5, wherein the target code amount is determined based on the total code amount of image data having been encoded among image data which had been captured at the first timing by the plurality of image capturing devices and a basic code amount set to the first image capturing device.

7. The image processing apparatus according to claim 6, wherein the basic code amount is determined based on a value obtained by dividing a communication bandwidth to be used to transmit encoded image data by a total number of the plurality of image capturing devices.

8. The image processing apparatus according to claim 6, wherein the one or more processors execute the instructions to:

generate, from an image captured by the first image capturing device, a foreground image including a predetermined object and a background image not including the predetermined object, wherein the basic code amount is determined based on a number of pixels of the foreground image generated from the image captured at the second timing by the first image capturing device.

9. The image processing apparatus according to claim 6, wherein the one or more processors execute the instructions to:

determine whether or not the encoding parameter is updated based on the total code amount of image data having been encoded among image data which had been captured at the first timing by the plurality of image capturing devices and a basic code amount set to the first image capturing device;

encode, if it is determined that the encoding parameter is updated, the first image data according to the encoding parameter determined based on the obtained evaluation information of the encoded second image data and the obtained evaluation information of the encoded third image data; and encode, if it is determined that the encoding parameter is not updated, the first image data according to an encoding parameter when encoding the second image data.

10. The image processing apparatus according to claim 1, wherein the one or more processors execute the instructions to:

receive the encoded third image data from another image processing apparatus connected to the second image capturing device; and transmit the encoded first image data and the encoded third image data to another image processing apparatus connected to a third image capturing device or an image generation apparatus that generates the virtual view-point image.

11. The image processing apparatus according to claim 1, wherein a difference between a line-of-sight direction of the first image capturing device and a line-of-sight direction of the second image capturing device falls within a predetermined range.

12. The image processing apparatus according to claim 1, wherein the first image capturing device and the second image capturing device are focused on a same gaze point.

13. The image processing apparatus according to claim 1, wherein the first image capturing device and the second image capturing device are placed adjacent to each other.

14. The image processing apparatus according to claim 1, wherein each of the plurality of the image capturing devices captures an image at a predetermined cycle, and
    wherein the second timing is a timing one cycle before the first timing.

15. The image processing apparatus according to claim 1, wherein the encoding parameter is a quantization parameter.

16. The image processing apparatus according to claim 1, wherein the evaluation information of the encoded second image data includes at least one of PSNR, SSIM, or a quantization parameter, and
    wherein the evaluation information of the encoded third image data includes at least one of PSNR, SSIM, or a quantization parameter.

* * * * *